(12) United States Patent
Feng et al.

(10) Patent No.: US 10,802,491 B2
(45) Date of Patent: Oct. 13, 2020

(54) METHODS AND SYSTEMS FOR TARGET TRACKING

(71) Applicant: SZ DJI TECHNOLOGY CO., LTD., Shenzhen (CN)

(72) Inventors: Xuyang Feng, Shenzhen (CN); Cong Zhao, Shenzhen (CN); Jie Qian, Shenzhen (CN); Junfeng Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 73 days.

(21) Appl. No.: 16/116,169

(22) Filed: Aug. 29, 2018

(65) Prior Publication Data

US 2019/0011922 A1 Jan. 10, 2019

Related U.S. Application Data

(63) Continuation of application No. PCT/CN2016/075247, filed on Mar. 1, 2016.

(51) Int. Cl.
*G05D 1/00* (2006.01)
*G05D 1/10* (2006.01)
(Continued)

(52) U.S. Cl.
CPC ......... *G05D 1/0094* (2013.01); *B64C 39/024* (2013.01); *G05D 1/0038* (2013.01);
(Continued)

(58) Field of Classification Search
CPC ........ G05D 1/0094; G05D 1/12; G05D 1/101; G05D 1/0038; G06K 9/6202;
(Continued)

(56) References Cited

U.S. PATENT DOCUMENTS

| 2012/0328203 A1 | 12/2012 | Medasani et al. |
| 2013/0200207 A1 | 8/2013 | Pongratz et al. |

(Continued)

FOREIGN PATENT DOCUMENTS

| CN | 101567046 A | 10/2009 |
| CN | 102045549 A | 5/2011 |

(Continued)

OTHER PUBLICATIONS

The World Intellectual Property Organization (WIPO) International Search Report and Written Opinion for PCT/CN2016/075247 dated Nov. 22, 2016 7 pages.

*Primary Examiner* — Brian P Sweeney
(74) *Attorney, Agent, or Firm* — Anova Law Group, PLLC

(57) ABSTRACT

A method includes obtaining an image frame captured by an imaging device carried by an unmanned vehicle and containing the target object, extracting one or more features of a target object from a region selected by a user on the image frame, and determining whether the target object is a predetermined recognizable object type based on a comparison of the one or more features with one or more characteristics associated with the predetermined recognizable object type. If the target object is the predetermined recognizable object type, tracking functions associated with the predetermined recognizable object type are initiated. IF the target object does not belong to the predetermined recognizable object type, tracking functions associated with a general object type are initiated.

18 Claims, 25 Drawing Sheets

(51) Int. Cl.
  *B64C 39/02* (2006.01)
  *G05D 1/12* (2006.01)
  *G06K 9/00* (2006.01)
  *G06K 9/20* (2006.01)
  *G06K 9/62* (2006.01)

(52) U.S. Cl.
  CPC .............. *G05D 1/101* (2013.01); *G05D 1/12* (2013.01); *G06K 9/0063* (2013.01); *G06K 9/2081* (2013.01); *G06K 9/6202* (2013.01); *B64C 2201/123* (2013.01); *B64C 2201/127* (2013.01); *B64C 2201/141* (2013.01); *B64C 2201/146* (2013.01)

(58) Field of Classification Search
  CPC .. G06K 9/2081; G06K 9/0063; B64C 39/024; B64C 2201/123; B64C 2201/146; B64C 2201/141; B64C 2201/127
  USPC .......................................................... 701/2
  See application file for complete search history.

(56) References Cited

U.S. PATENT DOCUMENTS

| | | | |
|---|---|---|---|
| 2014/0050352 A1* | 2/2014 | Buehler | ............... G06K 9/0063 382/103 |
| 2015/0105946 A1 | 4/2015 | Kumar et al. | |
| 2016/0078759 A1 | 3/2016 | Nerayoff et al. | |

FOREIGN PATENT DOCUMENTS

| | | | |
|---|---|---|---|
| CN | 103810226 A | 5/2014 | |
| CN | 104850234 A | 8/2015 | |
| GB | 2516691 A | 2/2015 | |

\* cited by examiner

1600

1612
When the target object is determined to be a predetermined recognizable object type, the tracking functions associated with the predetermined recognizable object type include adjusting one or more control parameters that control one or more selected from a spatial relationship between the unmanned vehicle and the target object, a movement of the unmanned vehicle, and a movement of a gimbal borne by the unmanned vehicle

1614
The one or more control parameters are generated in accordance with one or more characteristics associated with the predetermined recognizable object type.

1616
The one or more control parameters comprise one or more selected from a yaw angle movement of the unmanned vehicle, a translational movement of the unmanned vehicle, a velocity of the unmanned vehicle, and an acceleration of the unmanned vehicle.

1618
The imaging device is coupled to the gimbal borne by the unmanned vehicle, and wherein the one or more control parameters further comprise one or more selected from a yaw angle movement of the gimbal, and a pitch angle movement of the gimbal

1620
Determine the spatial relationship between the unmanned vehicle and the target object using at least the one or more characteristics associated with the predetermined recognizable object type

1622
Prior to determining the spatial relationship between the unmanned vehicle and the target object, determine whether a dimension of the target object displayed in the first image frame is above a predetermined threshold value; in accordance with a determination that the dimension of the target object is above or equal to the predetermined threshold value, determine the spatial relationship between the unmanned vehicle and the target object; and in accordance with a determination that the dimension of the target object is below the predetermined threshold value, initiate tracking functions associated with the general object type

1612
When the target object is determined to be a predetermined recognizable object type, the tracking functions associated with the predetermined recognizable object type include adjusting one or more control parameters that control one or more selected from a spatial relationship between the unmanned vehicle and the target object, a movement of the unmanned vehicle, and a movement of a gimbal borne by the unmanned vehicle

1624
The spatial relationship between the unmanned vehicle and the target object comprises a horizontal distance between the unmanned vehicle and the target object.

1626
The spatial relationship comprises a pitch angle between the unmanned vehicle and the target object, and the method further comprises: determining whether the pitch angle is lower than a predetermined value.

1628
The pitch angle is determined using a pitch angle of a gimbal borne by the unmanned vehicle for carrying the imaging device and a target pitch angle of the target object displayed on the first image frame

1630
In accordance with a determination that the pitch angle is lower than the predetermined value, send a warning indication to the user

1632
Adjust, or allowing the user to adjust, one or more control parameters of the unmanned vehicle such that an updated pitch angle is equal to or above the predetermined value; and obtain one or more image frames subsequent to the first image frame for determining the updated pitch angle

1634
In accordance with a determination that the pitch angle is higher or equal to the predetermining value, send a request to the user to confirm to initiate an automatic tracking mode

1634
In accordance with a determination that the pitch angle is higher or equal to the predetermining value, send a request to the user to confirm to initiate an automatic tracking mode

1636
In accordance with a determination that the user does not confirm to initiate the automatic tracking mode, the method further comprises:
obtaining a second image frame including the target object subsequent to the first image frame;
determining whether the target object is a predetermined recognizable object type based on a comparison of extracted one or more features from the second image frame with one or more characteristics associated with the predetermined recognizable object type; and
in accordance with a determination that the target object does not belong to any predetermined recognizable object type, initiating the tracking options associated with the general object type

1612
When the target object is determined to be a predetermined recognizable object type, the tracking functions associated with the predetermined recognizable object type include adjusting one or more control parameters that control one or more selected from a spatial relationship between the unmanned vehicle and the target object, a movement of the unmanned vehicle, and a movement of a gimbal borne by the unmanned vehicle

1638
When the target object is identified to be a human, recognize one or more body gestures of the target object.

1640
Adjust one or more control parameters of the unmanned vehicle in accordance with the one or more body gestures of the target object.

1642
When the target object is identified to be a human, perform a facial recognition of the target object to retrieve one or more facial features of the target object.

1612
When the target object is determined to be a predetermined recognizable object type, the tracking functions associated with the predetermined recognizable object type include adjusting one or more control parameters that control one or more selected from a spatial relationship between the unmanned vehicle and the target object, a movement of the unmanned vehicle, and a movement of a gimbal borne by the unmanned vehicle

1644
When the target object is identified to be a human, perform machine learning to obtain one or more personal features of the target object, and wherein the obtained personal features are used for automatically tracking the target object by the unmanned vehicle.

1646
Determine whether a height of the unmanned vehicle relative to the ground is within a predetermined height range

1648
Obtain the one or more characteristics associated with one or more predetermined recognizable object types respectively

1650
The one or more characteristics associated with the predetermined recognizable object type comprise one or more selected from a category, a shape, a pattern, a length range, a width range, a height range, a speed range, and an acceleration range of one or more objects of the predetermined recognizable object type

1652
The one or more features of the target object comprise one or more dimensional features displayed on the first image frame, wherein the one or more dimensional features are selected from a shape, a pattern, a length, a width, and a height of the target object.

1654
Generate a bounding box based on the one or more dimensional features of the target object for defining the target object on the first image frame.

1656
Obtain a second image frame including the target object captured by the imaging device, wherein the one or more features of the target further comprise a speed and an acceleration of the target object calculated based on the one or more dimensional features of the target object

1658
Determine whether the target object is a predetermined recognizable object type comprises:
providing one or more candidate recognizable object types for user selection, wherein the one or more candidate recognizable object types are identified based on the comparison between the extracted one or more features and one or more characteristics associated with one or more predetermined recognizable object types respectively; and
receiving a user input indicating the target object is the predetermined recognizable object type selected from the one or more candidate recognizable object types

1660
When the target object is determined to be the general object type, determine a spatial relationship between the target object and the unmanned vehicle using the one or more extracted features.

1662
The spatial relationship between the target object and the unmanned vehicle comprises a horizontal distance between the target object and the unmanned vehicle, and
wherein the method further comprises determining whether the horizontal distance is within a predetermined distance range

1664
In accordance with a determination that the horizontal distance is within the predetermined distance range, provide an option to the user to confirm to initiate the automatic tracking mode

1666
In accordance with a determination that the user does not confirm to initiate the automatic tracking mode, the method further comprise: obtaining a second image frame including the target object subsequent to the first image frame; determining whether the target object is a predetermined recognizable object type based on a comparison of extracted one or more features from the second image frame with one or more characteristics associated with the predetermined recognizable object type; and in accordance with a determination that the target object is a predetermined recognizable object type, initiating the tracking options associated with the predetermined recognizable object type.

1662
The spatial relationship between the target object and the unmanned vehicle comprises a horizontal distance between the target object and the unmanned vehicle, and wherein the method further comprises determining whether the horizontal distance is within a predetermined distance range

1670
The horizontal distance range is determined in accordance with a height of the unmanned vehicle relative to the ground.

1672
In accordance with a determination that the horizontal distance is not within the predetermined distance range, send a warning indication to the user.

1674
Adjusting, or allow the user to adjust, one or more control parameters of the unmanned vehicle such that an updated spatial relationship between the unmanned vehicle and the target object becomes suitable for initiating the automatic tracking mode; and obtain one or more image frames subsequent to the first image frame for determining the updated spatial relationship between the unmanned vehicle and the target object.

1676
The tracking functions associated with the predetermined recognizable object type include enabling one or more functional modules that allow the unmanned vehicle to be controlled by a user input

1678
Obtain a second image frame captured by the imaging device; in accordance with a determination that the target object is not included in the second image frame, identify one or more candidate target objects from the second image frame which belong to the predetermined recognizable object type, wherein the one or more candidate target objects are identified based on comparison between one or more features extracted from the one or more candidate target objects respectively and one or more characteristics associated with the predetermined recognizable object type; and determine whether the one or more extracted features of the respective one or more candidate target objects fit a target object model generated based on the one or more extracted features of the target object; and in accordance with a determination that one or more extracted features of a candidate target object fits the target object model, initiate the tracking operations associated with the target object.

Figure 16G

METHODS AND SYSTEMS FOR TARGET TRACKING

CROSS-REFERENCE TO RELATED APPLICATION

This application is a continuation of International Application No. PCT/CN2016/075247, filed on Mar. 1, 2016, the entire contents of which are incorporated herein by reference.

TECHNICAL FIELD

The disclosed embodiments relate generally to target tracking and more particularly, but not exclusively, to initialization for automatic target tracking using characteristics associated with a recognizable object type.

BACKGROUND

Movable objects such as unmanned aerial vehicles (UAVs) can be used for performing surveillance, reconnaissance, and exploration tasks for military and civilian applications. A movable object may carry a payload configured to perform a specific function, such as capturing images of the surrounding environment or tracking a specific target. For example, a movable object may track an object moving along the ground or through the air. Movement control information for controlling a movable object is typically received by the movable object from a remote device and/or determined by the movable object.

Before a UAV starts to track a target, an initialization process may be performed to ensure that one or more conditions are optimized for automatically tracking the target. Various methods may be used for improving the initialization process.

SUMMARY

There is a need for systems and methods for improved target tracking. Such systems and methods optionally complement or replace conventional methods for target tracking.

In accordance with some embodiments, a method for tracking a target object includes obtaining a first image frame captured by an imaging device borne by an unmanned vehicle, the first image frame containing the target object. The method extracts one or more features of the target object from the first image frame. The target object is within a region selected by a user on the first image frame. The method also determines whether the target object is a predetermined recognizable object type based on a comparison of the extracted one or more features with one or more characteristics associated with the predetermined recognizable object type. In accordance with a determination that the target object is a predetermined recognizable object type, tracking functions provided in the computing system and associated with the predetermined recognizable object type are initiated. In accordance with a determination that the target object does not belong to any predetermined recognizable object type, tracking functions provided in the computing system and associated with a general object type are initiated.

In accordance with some embodiments, a system for tracking a target object comprises one or more processors; memory; and one or more programs, wherein the one or more programs are stored in the memory and configured to be executed by the one or more processors, the one or more programs including instructions for: obtaining a first image frame captured by an imaging device borne by an unmanned vehicle, the first image frame containing the target object; extracting one or more features of the target object from the first image frame, wherein the target object is within a region selected by a user on the first image frame; determining whether the target object is a predetermined recognizable object type based on a comparison of the extracted one or more features with one or more characteristics associated with the predetermined recognizable object type; in accordance with a determination that the target object is a predetermined recognizable object type, initiating tracking functions provided in the computing system and associated with the predetermined recognizable object type; and in accordance with a determination that the target object does not belong to any predetermined recognizable object type, initiating tracking functions provided in the computing system and associated with a general object type.

In accordance with some embodiments, a non-transitory computer readable storage medium stores one or more programs, the one or more programs comprising instructions, which when executed by a movable object, cause the movable object to: obtain a first image frame captured by an imaging device borne by an unmanned vehicle, the first image frame containing the target object; extract one or more features of the target object from the first image frame, wherein the target object is within a region selected by a user on the first image frame; determine whether the target object is a predetermined recognizable object type based on a comparison of the extracted one or more features with one or more characteristics associated with the predetermined recognizable object type; in accordance with a determination that the target object is a predetermined recognizable object type, initiate tracking functions provided in the computing system and associated with the predetermined recognizable object type; and in accordance with a determination that the target object does not belong to any predetermined recognizable object type, initiate tracking functions provided in the computing system and associated with a general object type.

In accordance with some embodiments, an unmanned aerial vehicle (UAV) comprises: a propulsion system and one or more sensors. The UAV is configured to: obtain a first image frame captured by an imaging device borne by an unmanned vehicle, the first image frame containing the target object; extract one or more features of the target object from the first image frame, wherein the target object is within a region selected by a user on the first image frame; determine whether the target object is a predetermined recognizable object type based on a comparison of the extracted one or more features with one or more characteristics associated with the predetermined recognizable object type; in accordance with a determination that the target object is a predetermined recognizable object type, initiate tracking functions provided in the computing system and associated with the predetermined recognizable object type; and in accordance with a determination that the target object does not belong to any predetermined recognizable object type, initiate tracking functions provided in the computing system and associated with a general object type.

BRIEF DESCRIPTION OF THE DRAWINGS

FIGS. 16A-16G are a flow diagram illustrating a method for tracking a target, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below in accordance with embodiments of the disclosure.

The present disclosure provides techniques related to initialization for target tracking by UAVs. In some embodiments, a user selects a target from an image displayed on a user interface of the control unit. For example, the image is displayed and the input is received via a touchscreen of the control unit. In some embodiments, the system performs an initialization of target tracking. The initialization process includes feature extractions and target classification. In some embodiments, the system determines whether the target is a predetermined recognizable type or a general type. Preset characteristics associated with predetermined recognizable type can be used for determining whether the UAV is ready for automatic target tracking. Preset characteristics associated with predetermined recognizable type can also be used for adjusting one or more control parameters for controlling the UAV, the carrier, and/or the imaging device. In some embodiments, when the initialization is completed, the control unit and/or UAV manage operations associated with target tracking. In some embodiments, only image data of the target is used for performing the initialization process. In this manner, the system can track target which does not include a position measuring unit, e.g., a GPS to provide position information of the target.

Figure 1:
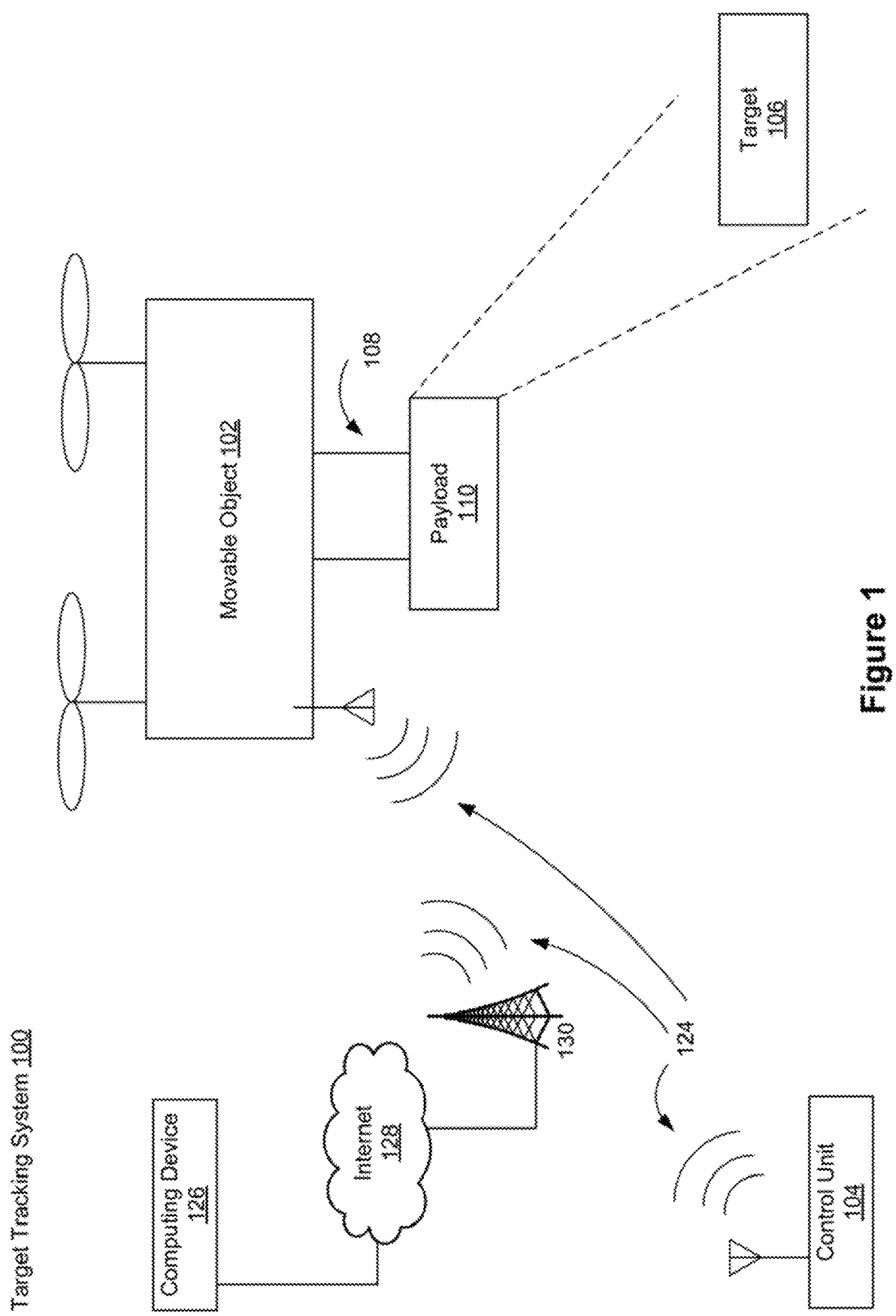
FIG. 1 illustrates a target tracking system, in accordance with some embodiments.

FIG. 1 illustrates a target tracking system 100, in accordance with various embodiments of the present disclosure. Target tracking system 100 includes a movable object 102 and a control unit 104. In some embodiments, target tracking system 100 is used to track target 106 and/or initiate tracking target 106.

In some embodiments, target 106 includes natural and/or man-made objects such geographical landscapes (e.g., mountains, vegetation, valleys, lakes, and/or rivers), buildings, and/or vehicles (e.g., aircrafts, ships, cars, trucks, buses, vans, and/or motorcycles). In some embodiments, the target 106 includes live subjects such as people and/or animals. In some embodiments, target 106 is moving, e.g., moving relative to a reference frame (such as the Earth and/or movable object 102). In some embodiments, target 106 is static. In some embodiments, target 106 includes an active target system that transmits information about target 106, such as the target's GPS location, to movable object 102, control unit 104, and/or computing device 126. For example, information is transmitted to movable object 102 via wireless communication from a communication unit of the active target to communication system 120 (shown in FIG. 2A) of movable object 102. Active targets include, e.g., friendly vehicles, buildings, and/or troops. In some embodiments, target 106 includes a passive target (e.g., that does not transmit information about target 106). Passive targets include, e.g., neutral or hostile vehicles, buildings, and/or troops.

In some embodiments, movable object 102 is configured to communicate with control unit 104, e.g., via wireless communications 124. For example, movable object 102 receives control instructions from control unit 104 and/or sends data (e.g., data from movable object sensing system 122 (shown in FIG. 2A)) to control unit 104.

Control instructions include, e.g., navigation instructions for controlling navigational parameters of movable object 102 such as position, orientation, attitude, and/or one or more movement characteristics of movable object 102, carrier 108, and/or payload 110. In some embodiments, control instructions include instructions directing movement of one or more of movement mechanisms 114 (shown in FIG. 2A). For example, control instructions are used to control flight of a UAV. In some embodiments, control instructions include information for controlling operations (e.g., movement) of carrier 108. For example, control instructions are used to control an actuation mechanism of carrier 108 so as to cause angular and/or linear movement of payload 110 relative to movable object 102. In some embodiments, control instructions are used to adjust one or more operational parameters for payload 110, such as instructions for capturing one or more images, capturing video, adjusting a zoom level, powering on or off, adjusting an imaging mode (e.g., capturing still images or capturing video), adjusting an image resolution, adjusting a focus, adjusting a viewing angle, adjusting a field of view, adjusting a depth of field, adjusting an exposure time, adjusting a shutter speed, adjusting a lens speed, adjusting an ISO, changing a lens and/or moving payload 110 (and/or a part of payload 110, such as imaging device 214 (shown in FIG. 2C)). In some embodiments, the control instructions are used to control communication system 120, sensing system 122, and/or another component of movable object 102.

In some embodiments, control instructions from control unit 104 include target information, as described further below with regard to FIG. 7.

In some embodiments, movable object 102 is configured to communicate with computing device 126. For example, movable object 102 receives control instructions from computing device 126 and/or sends data (e.g., data from movable object sensing system 122) to computing device 126. In some embodiments, communications from computing device 126 to movable object 102 are transmitted from computing device 126 to cell tower 130 (e.g., via internet 128) and from cell tower 130 to movable object 102 (e.g., via RF signals). In some embodiments, a satellite is used in lieu of or in addition to cell tower 130.

In some embodiments, target tracking system includes additional control units 104 and/or computing devices 126 configured to communicate with movable object 102.

Figure 2A:
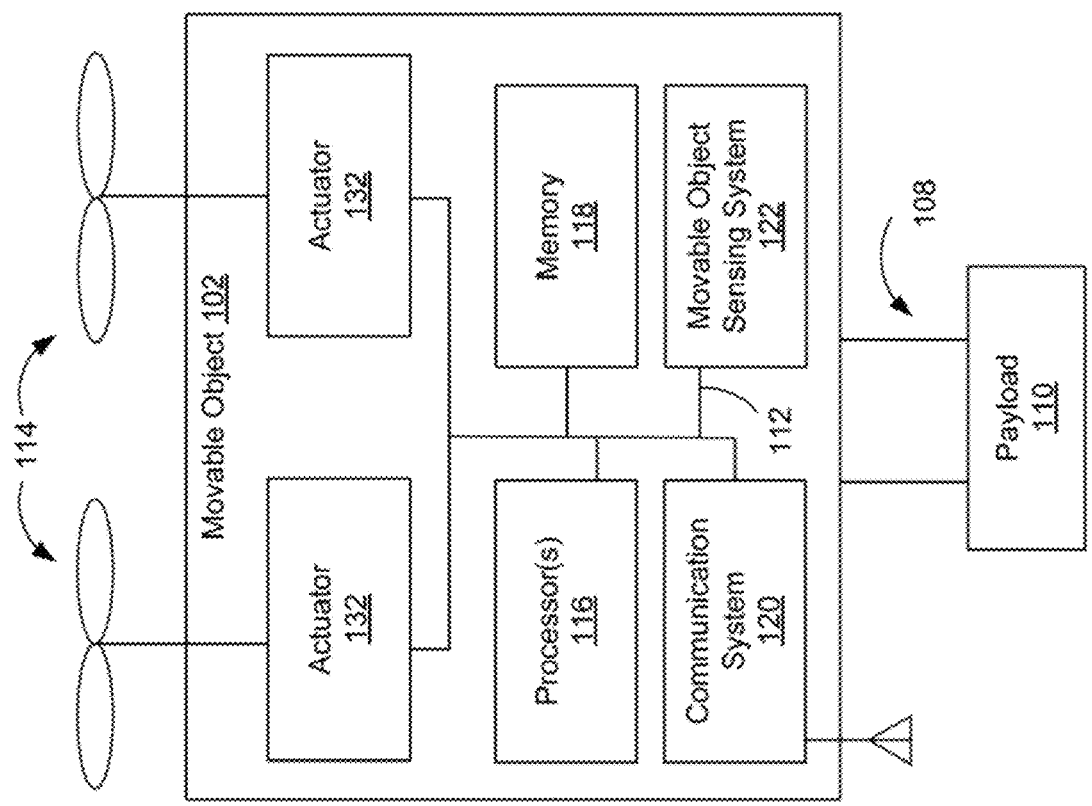
FIG. 2A illustrates an exemplary movable object in a target tracking system, in accordance with some embodiments.

FIG. 2A illustrates an exemplary movable object 102 in target tracking system 100, in accordance with some embodiments. In some embodiments, one or more components of movable object, such as processor(s) 116, memory 118, communication system 120, and sensing system 122, are connected by data connections, such as a control bus 112. A control bus optionally includes circuitry (sometimes called a chipset) that interconnects and controls communications between system components.

Movable object 102 typically includes one or more processing units 116, memory 118, one or more network or other communications interfaces 120, sensing system 122, and one or more communication buses 112 for interconnecting these components. In some embodiments, movable object 102 is a UAV. Although movable object 102 is depicted as an aircraft, this depiction is not intended to be limiting, and any suitable type of movable object can be used.

In some embodiments, movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). Movement mechanisms 114 include one or more movement mechanism types such as rotors, propellers, blades, engines, motors, wheels, axles, magnets, nozzles, animals, and/or human beings. Movement mechanisms 114 are coupled to movable object 102 at, e.g., the top, bottom, front, back, and/or sides. In some embodiments, movement mechanisms 114 of a single movable object 102 include multiple movement mechanisms each having the same type. In some embodiments, movement mechanisms 114 of a single movable object 102 include multiple movement mechanisms having different movement mechanism types. Movement mechanisms 114 are coupled to movable object 102 (or vice-versa) using any suitable means, such as support elements (e.g., drive shafts) or other actuating elements (e.g., actuators 132). For example, an actuator 132 receives control signals from processor(s) 116 (e.g., via control bus 112) that activates the actuator to cause movement of a movement mechanism 114. For example, processor(s) 116 include an electronic speed controller that provides control signals to actuators 132.

In some embodiments, the movement mechanisms 114 enable movable object 102 to take off vertically from a surface or land vertically on a surface without requiring any horizontal movement of movable object 102 (e.g., without traveling down a runway). In some embodiments, movement mechanisms 114 are operable to permit movable object 102 to hover in the air at a specified position and/or orientation. In some embodiments, one or more of the movement mechanisms 114 are controllable independently of one or more of the other movement mechanisms 114. For example, when movable object 102 is a quadcopter, each rotor of the quadcopter is controllable independently of the other rotors of the quadcopter. In some embodiments, multiple movement mechanisms 114 are configured for simultaneous movement.

In some embodiments, movement mechanisms 114 include multiple rotors that provide lift and/or thrust to movable object. The multiple rotors are actuated to provide, e.g., vertical takeoff, vertical landing, and hovering capabilities to movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of movable object 102 (e.g., with respect to up to three degrees of translation and/or up to three degrees of rotation).

In some embodiments, carrier 108 is coupled to movable object 102. A payload 110 is coupled to carrier 108. In some embodiments, carrier 108 includes one or more mechanisms that enable payload 110 to move relative to movable object 102, as described further with reference to FIG. 2B. In some embodiments, payload 110 is rigidly coupled to movable object 102 such that payload 110 remains substantially stationary relative to movable object 102. For example, carrier 108 is coupled to payload 110 such that payload is not movable relative to movable object 102. In some embodiments, payload 110 is coupled to movable object 102 without requiring carrier 108.

Communication system 120 enables communication with control unit 104 and/or computing device 126, e.g., via wireless signals 124. The communication system 120 includes, e.g., transmitters, receivers, and/or transceivers for wireless communication. In some embodiments, the communication is one-way communication, such that data is transmitted only from movable object 102 to control unit 104, or vice-versa. In some embodiments, communication is two-way communication, such that data is transmitted in both directions between movable object 102 and control unit 104.

In some embodiments, movable object 102 communicates with computing device 126. In some embodiments, movable object 102, control unit 104, and/or the remote device are connected to the Internet or other telecommunications network, e.g., such that data generated by movable object 102, control unit 104, and/or computing device 126 is transmitted to a server for data storage and/or data retrieval (e.g., for display by a website).

Figure 3:
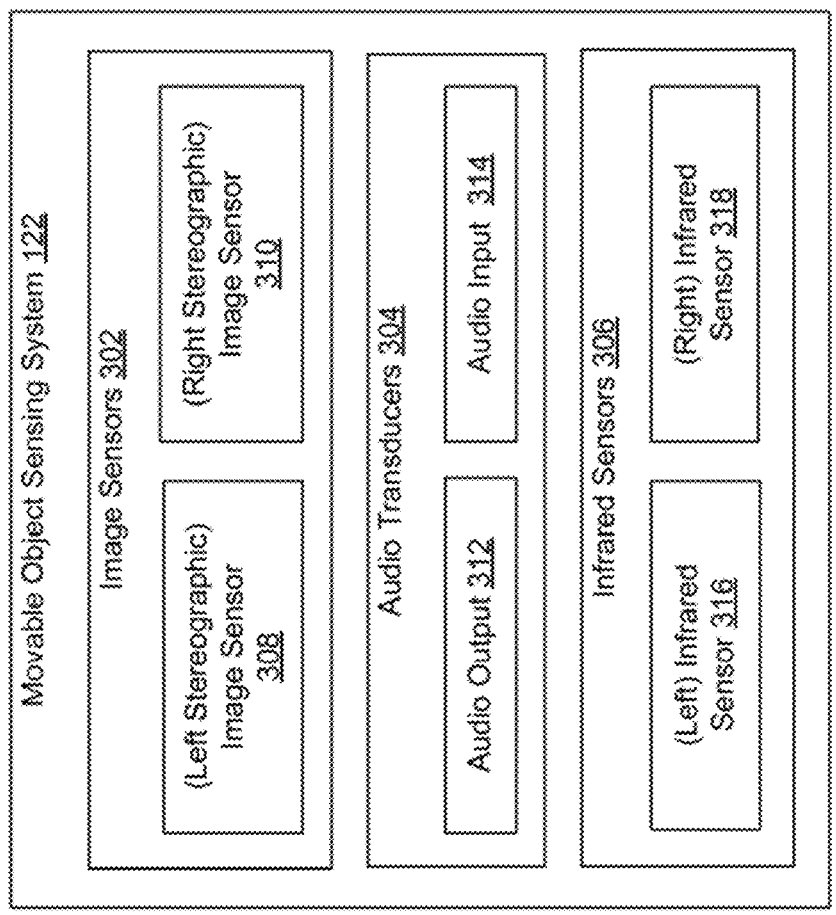
FIG. 3 illustrates an exemplary sensing system of a movable object, in accordance with some embodiments.

In some embodiments, sensing system 122 of movable object 102 includes one or more sensors, as described further with reference to FIG. 3. In some embodiments, movable object 102 and/or control unit 104 use sensing data generated by sensors of sensing system 122 to determine information such as a position of movable object 102, an orientation of movable object 102, movement characteristics of movable object 102 (e.g., angular velocity, angular acceleration, translational velocity, translational acceleration and/or direction of motion along one or more axes), proximity of movable object 102 to potential obstacles, weather conditions, locations of geographical features and/or locations of manmade structures.

Figure 2B:
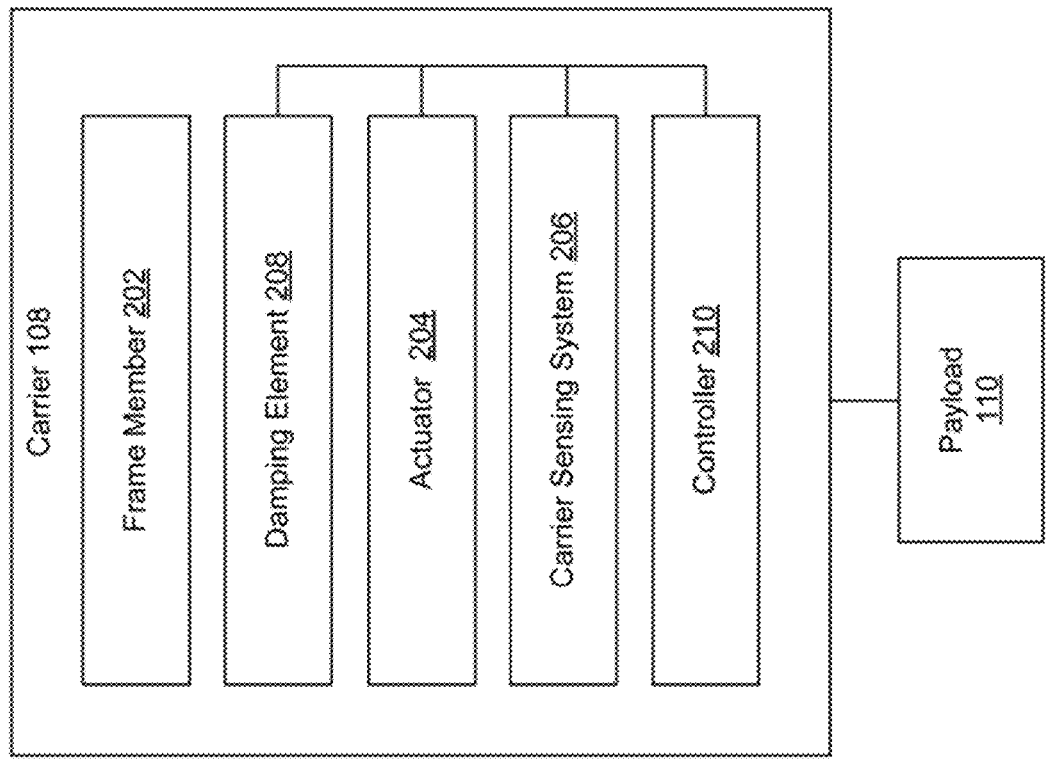
FIG. 2B illustrates an exemplary carrier of a movable object, in accordance with some embodiments.
Figure 2B:
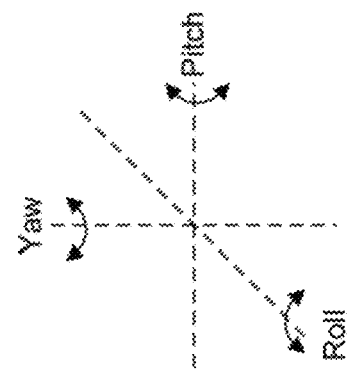

FIG. 2B illustrates an exemplary carrier 108 in a target tracking system 100, in accordance with embodiments. In some embodiments, carrier 108 couples a payload 110 to a movable object 102.

In some embodiments, carrier 108 includes a frame assembly including one or more frame members 202. In some embodiments, frame member 202 is coupled with movable object 102 and payload 110. In some embodiments, frame member 202 supports payload 110.

In some embodiments, carrier 108 includes one or more mechanisms, such as one or more actuators 204, to cause movement of carrier 108 and/or payload 110. Actuator 204 is, e.g., a motor, such as a hydraulic, pneumatic, electric, thermal, magnetic, and/or mechanical motor. In some embodiments, actuator 204 causes movement of frame member 202. In some embodiments, actuator 204 rotates payload 110 about one or more axes, such as three axes: X axis ("pitch axis"), Z axis ("roll axis"), and Y axis ("yaw axis"), relative to movable object 102. In some embodiments, actuator 204 translates payload 110 along one or more axes relative to movable object 102.

In some embodiments, carrier 108 includes one or more carrier sensing system 206, e.g., for determining a state of carrier 108 or payload 110. Carrier sensing system 206 includes, e.g., motion sensors (e.g., accelerometers), rotation sensors (e.g., gyroscopes), potentiometers, and/or inertial sensors. In some embodiments, carrier sensing system 206 includes one or more sensors of movable object sensing system 122 as described below with regard to FIG. 3. Sensor data determined by carrier sensing system 206 includes, e.g., spatial disposition (e.g., position, orientation, or attitude) and/or movement information such as velocity (e.g., linear or angular velocity) and/or acceleration (e.g., linear or angular acceleration) of carrier 108 and/or payload 110. In some embodiments, sensing data and/or state information calculated from the sensing data are used as feedback data to control the movement of one or more components (e.g., frame member 202, actuator 204, and/or damping element 208) of carrier 108. Carrier sensor 206 is coupled to, e.g., frame member 202, actuator 204, damping element 208, and/or payload 110. In an embodiment, carrier sensor 206 (e.g., a potentiometer) measures movement of actuator 204 (e.g., the relative positions of a motor rotor and a motor stator) and generates a position signal representative of the movement of the actuator 204 (e.g., a position signal representative of relative positions of the motor rotor and the motor stator). In some embodiments, data generated by a carrier sensor 206 is received by processor(s) 116 and/or memory 118 of movable object 102.

In some embodiments, the coupling of carrier 108 to movable object 102 includes one or more damping elements 208. Damping elements 208 are configured to reduce or eliminate movement of the load (e.g., payload 110 and/or carrier 108) caused by movement of movable object 102. Damping elements 208 include, e.g., active damping elements, passive damping elements, and/or hybrid damping elements having both active and passive damping characteristics. The motion damped by the damping elements 208 can include one or more of vibrations, oscillations, shaking, or impacts. Such motions may originate from motions of movable object that are transmitted to the load. For example, the motion may include vibrations caused by the operation of a propulsion system and/or other components of a movable object 101.

In some embodiments, a damping element 208 provides motion damping by isolating the load from the source of unwanted motion by dissipating or reducing the amount of motion transmitted to the load (e.g., vibration isolation). In some embodiments, damping element 208 reduces the magnitude (e.g., amplitude) of the motion that would otherwise be experienced by the load. In some embodiments the motion damping applied by a damping element 208 is used to stabilize the load, thereby improving the quality of images captured by the load (e.g., image capturing device or imaging device), as well as reducing the computational complexity of image stitching steps required to generate a panoramic image based on the captured images.

Damping element 208 described herein can be formed from any suitable material or combination of materials, including solid, liquid, or gaseous materials. The materials used for the damping elements may be compressible and/or deformable. For example, the damping element 208 is made of, e.g. sponge, foam, rubber, gel, and the like. For example, damping element 208 includes rubber balls that are substantially spherical in shape. The damping element 208 is, e.g., substantially spherical, rectangular, and/or cylindrical. In some embodiments, damping element 208 includes piezoelectric materials or shape memory materials. In some embodiments, damping elements 208 include one or more mechanical elements, such as springs, pistons, hydraulics, pneumatics, dashpots, shock absorbers, isolators, and the like. In some embodiments, properties of the damping element 208 are selected so as to provide a predetermined amount of motion damping. In some instances, the damping element 208 has viscoelastic properties. The properties of damping element 208 are, e.g., isotropic or anisotropic. In some embodiments, damping element 208 provides motion damping equally along all directions of motion. In some embodiments, damping element 208 provides motion damping only along a subset of the directions of motion (e.g., along a single direction of motion). For example, the damping element 208 may provide damping primarily along the Y (yaw) axis. In this manner, the illustrated damping element 208 reduces vertical motions.

In some embodiments, carrier 108 includes controller 210. Controller 210 includes, e.g., one or more controllers and/or processors. In some embodiments, controller 210 receives instructions from processor(s) 116 of movable object 102. For example, controller 210 is connected to processor(s) 116 via control bus 112. In some embodiments, controller 210 controls movement of actuator 204, adjusts one or more parameters of carrier sensor 206, receives data from carrier sensor 206, and/or transmits data to processor 116.

Figure 2C:
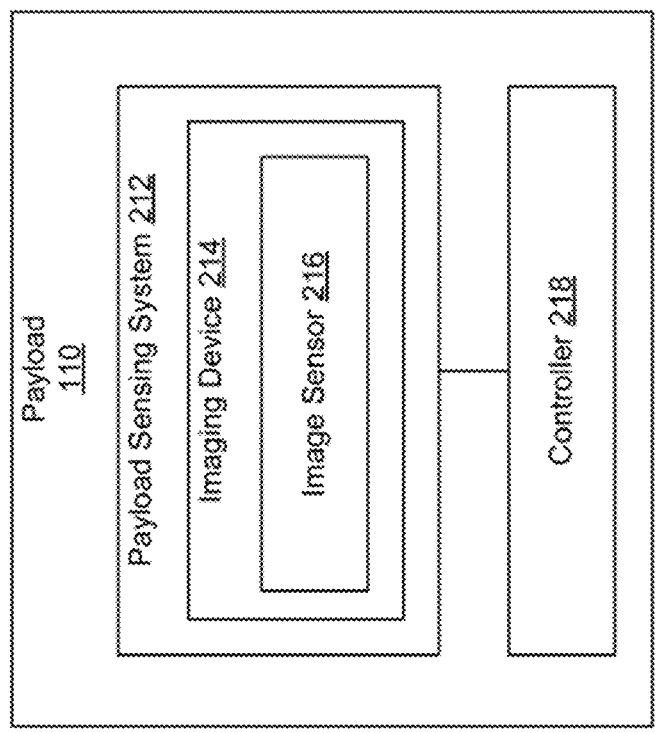
FIG. 2C illustrates an exemplary payload of a movable object, in accordance with some embodiments.

FIG. 2C illustrates an exemplary payload 110 in a target tracking system 100, in accordance with some embodiments. In some embodiments, payload 110 includes a payload sensing system 212 and a controller 218. In some embodiments, payload sensing system 212 includes an imaging device 214, such as a camera. In some embodiments, payload sensing system 212 includes one or more sensors of movable object sensing system 122 as described below with regard to FIG. 3.

Payload sensing system 212 generates static sensing data (e.g., a single image captured in response to a received instruction) and/or dynamic sensing data (e.g., a series of images captured at a periodic rate, such as a video). Imaging device 214 includes, e.g., an image sensor 216 to detect light (such as visible light, infrared light, and/or ultraviolet light). In some embodiments, imaging device 214 includes one or more optical devices (e.g., lenses) to focus or otherwise alter the light onto image sensor 216.

In some embodiments, image sensors 216 includes, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors. Image sensor 216 and/or imaging device 214 capture, e.g., images and/or image streams (e.g., videos). Adjustable parameters of imaging device 214 include, e.g., width, height, aspect ratio, pixel count, resolution, quality, imaging mode, focus distance, depth of field, exposure time, shutter speed and/or lens configuration. In some embodiments, imaging device 214 is configured to capture high-definition or ultra-high-definition videos (e.g., 720p, 1080i, 1080p, 1440p, 2000p, 2160p, 2540p, 4000p, 4320p, and so on).

In some embodiments, payload 110 includes controller 218. Controller 218 includes, e.g., one or more controllers and/or processors. In some embodiments, controller 218 receives instructions from processor(s) 116 of movable object 102. For example, controller 218 is connected to processor(s) 116 via control bus 112. In some embodiments, controller 218 adjusts one or more parameters of one or more sensors of payload sensing system 212; receives data from one or more sensors of payload sensing system 212; and/or transmits data, such as image data from image sensor 216, to processor 116, memory 118, and/or control unit 104.

In some embodiments, data generated by one or more sensors of payload sensor system 212 is stored, e.g., by memory 118. In some embodiments, data generated by payload sensor system 212 are transmitted to control unit 104 (e.g., via communication system 120). For example, video is streamed from payload 110 (e.g., imaging device 214) to control unit 104. In this manner, control unit 104 displays, e.g., real-time (or slightly delayed) video received from imaging device 214.

In some embodiments, adjustment of the orientation, position, attitude, and/or one or more movement characteristics of movable object 102, carrier 108, and/or payload 110 is generated based at least in part on configurations (e.g., preset and/or user configured in system configuration 400) of movable object 102, carrier 108, and/or payload 110. For example, adjustment that involves rotation around two axes (e.g., yaw and pitch) is achieved solely by corresponding rotation of movable object around the two axes if payload 110 including imaging device 214 is rigidly coupled to movable object 102 (and hence not movable relative to movable object 102) and/or payload 110 is coupled to movable object 102 via a carrier 108 that does not permit relative movement between imaging device 214 and movable object 102. The same two-axis adjustment is achieved by, e.g., combining adjustment of both movable object 102 and carrier 108 if carrier 108 permits imaging device 214 to rotate around at least one axis relative to movable object 102. In this case, carrier 108 can be controlled to implement the rotation around one or two of the two axes required for the adjustment and movable object 120 can be controlled to implement the rotation around one or two of the two axes. For example, carrier 108 includes, e.g., a one-axis gimbal that allows imaging device 214 to rotate around one of the two axes required for adjustment while the rotation around the remaining axis is achieved by movable object 102. In some embodiments, the same two-axis adjustment is achieved by carrier 108 alone when carrier 108 permits imaging device 214 to rotate around two or more axes relative to movable object 102. For example, carrier 108 includes a two-axis or three-axis gimbal.

FIG. 3 illustrates an exemplary sensing system 122 of a movable object 102, in accordance with some embodiments. In some embodiments, one or more sensors of movable object sensing system 122 are mounted to the exterior, located within, or otherwise coupled to movable object 102. In some embodiments, one or more sensors of movable object sensing system are components of carrier sensing system 206 and/or payload sensing system 212. Where sensing operations are described as being performed by movable object sensing system 122 herein, it will be recognized that such operations are optionally performed by carrier sensing system 206 and/or payload sensing system 212.

Movable object sensing system 122 generates static sensing data (e.g., a single image captured in response to a received instruction) and/or dynamic sensing data (e.g., a series of images captured at a periodic rate, such as a video).

In some embodiments, movable object sensing system 122 includes one or more image sensors 302, such as image sensor 308 (e.g., a left stereographic image sensor) and/or image sensor 310 (e.g., a right stereographic image sensor). Image sensors 302 capture, e.g., images, image streams (e.g., videos), stereographic images, and/or stereographic image streams (e.g., stereographic videos). Image sensors 302 detect light, such as visible light, infrared light, and/or ultraviolet light. In some embodiments, movable object sensing system 122 includes one or more optical devices (e.g., lenses) to focus or otherwise alter the light onto one or more image sensors 302. In some embodiments, image sensors 302 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors.

In some embodiments, movable object sensing system 122 includes one or more audio transducers 304. For example, an audio detection system includes audio output transducer 312 (e.g., a speaker), and audio input transducer 314 (e.g. a microphone, such as a parabolic microphone). In some embodiments, microphone and a speaker are used as components of a sonar system. In some embodiments, a sonar system is used to track a target object, e.g., by detecting location information of a target object.

In some embodiments, movable object sensing system 122 includes one or more infrared sensors 306. In some embodiments, a distance measurement system includes a pair of infrared sensors e.g., infrared sensor 316 (such as a left infrared sensor) and infrared sensor 318 (such as a right infrared sensor) or another sensor or sensor pair. The distance measurement system is used to, e.g., measure a distance to a target 106.

In some embodiments, a system to produce a depth map includes one or more sensors or sensor pairs of movable object sensing system 122 (such as left stereographic image sensor 308 and right stereographic image sensor 310; audio output transducer 312 and audio input transducer 314; and/or left infrared sensor 316 and right infrared sensor 318. In some embodiments, a pair of sensors in a stereo data system (e.g., a stereographic imaging system) simultaneously captures data from different positions. In some embodiments, a depth map is generated by a stereo data system using the simultaneously captured data. In some embodiments, a depth map is used for positioning and/or detection operations, such as detecting a target object 106, and/or detecting current location information of a target object 106.

In some embodiments, movable object sensing system 122 includes one or more global positioning system (GPS) sensors, motion sensors (e.g., accelerometers), rotation sensors (e.g., gyroscopes), inertial sensors, proximity sensors (e.g., infrared sensors) and/or weather sensors (e.g., pressure sensor, temperature sensor, moisture sensor, and/or wind sensor).

In some embodiments, sensing data generated by one or more sensors of movable object sensing system 122 and/or information determined using sensing data from one or more sensors of movable object sensing system 122 are transmitted to control unit 104 (e.g., via communication system 120). In some embodiments, data generated one or more sensors of movable object sensing system 122 and/or information determined using sensing data from one or more sensors of movable object sensing system 122 is stored by memory 118.

Figure 4:
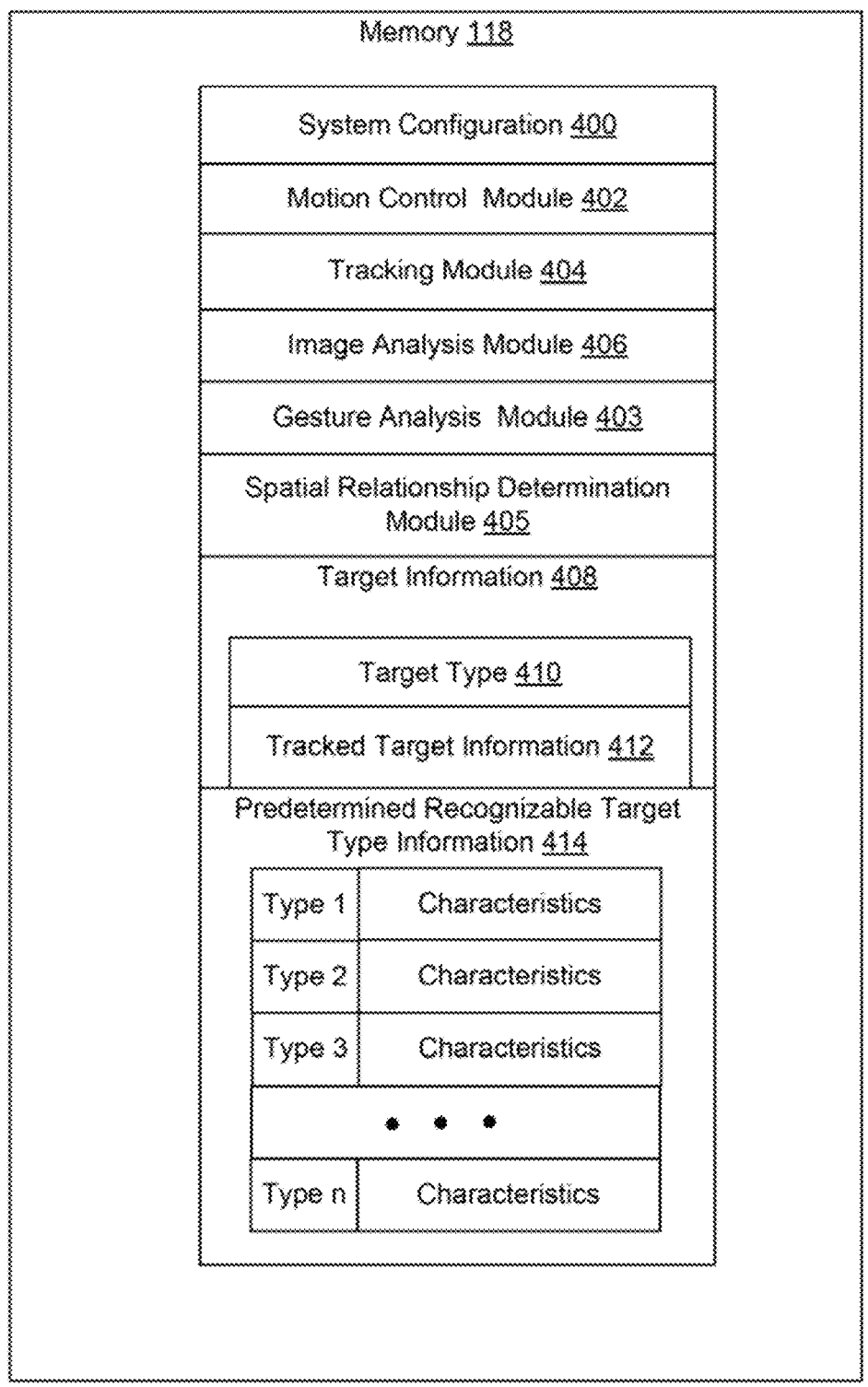
FIG. 4 is a block diagram illustrating an implementation of memory of a movable object, in accordance with some embodiments.

FIG. 4 is a block diagram illustrating an implementation of memory 118, in accordance with some embodiments. In some embodiments, one or more elements illustrated in FIG. 4 are located in control unit 104, computing device 126, and/or another device.

In some embodiments, memory 118 stores a system configuration 400. System configuration 400 includes one or more system settings (e.g., as configured by a manufacturer, administrator, and/or user). For example, a constraint on one or more of orientation, position, attitude, and/or one or more movement characteristics of movable object 102, carrier 108, and/or payload 110 is stored as a system setting of system configuration 400.

In some embodiments, memory 118 stores a motion control module 402. Motion control module stores, e.g., control instructions, such as control instructions received from control module 104 and/or computing device 126. Control instructions are used for, e.g., controlling operation of movement mechanisms 114, carrier 108, and/or payload 110.

In some embodiments, memory 118 stores a tracking module 404. In some embodiments, tracking module 404 generates tracking information for target 106 that is being tracked by movable object 102. In some embodiments, tracking information is generated based on images captured by imaging device 214 and/or output from image analysis module 406 (e.g., after pre-processing and/or processing operations have been performed on one or more images). Alternatively or in combination, tracking information is generated based on analysis of gestures of a human target. The gestures are captured by imaging device 214 and/or analyzed by gesture analysis module 403. Tracking information generated by tracking module 404 includes, for example, location, size, or other characteristics of target 106 within one or more images. In some embodiments, tracking information generated by tracking module 404 is transmitted to control unit 104 and/or computing device 126 (e.g., augmenting or otherwise combined with images and/or output from image analysis module 406). For example, tracking information is transmitted to control unit 104 in response to a request from control unit 104 and/or on a periodic basis.

In some embodiments, memory 118 includes an image analysis module 406. Image analysis module 406 performs processing operations on images, such as images captured by imaging device 214. In some embodiments, image analysis module performs pre-processing on raw image data, such as re-sampling to assure the correctness of the image coordinate system, noise reduction, contrast enhancement, and/or scale space representation. In some embodiments, processing operations performed on image data (including image data that has been pre-processed) include feature extraction, image segmentation, data verification, image recognition, image registration, and/or image matching. In some embodiments, output from image analysis module 406 after pre-processing and/or processing operations have been performed on one or more images is transmitted to control unit 104. In some embodiments, feature extraction is performed by control unit 104, processor(s) 116 of movable object 102, and/or computing device 126. In some embodiments, image analysis module 406 may use neural network to perform image recognition and/or classification of object(s) included in the image. For example, by comparing features extracted from target 106 included in the image with characteristics of one or more predetermined recognizable target object types, image analysis module 406 may recognize target 106 to be a certain predetermined recognizable target object type, e.g., a human.

In some embodiments, memory 118 includes a gesture analysis module 403. Gesture analysis module 403 performs processing operations on gestures of one or more human targets. The gestures may be captured by imaging device 214. Gesture analysis results may be fed to tracking module 404 and/or motion control module 402 for generating tracking information and/or control instructions respectively for controlling operations of movement mechanisms 114, carrier 108, and/or payload 110 of movable object 102. In some embodiments, a calibration process may be performed before using gestures of a human target to control movable object 102. For example, during the calibration process, gesture analysis module 403 captures certain features of human gestures associated with a certain control command and stores the gesture features in memory 118. When a human gesture is received, gesture analysis module 403 may extract features of the human gesture and compare with the stored features to determine whether the certain command is performed by the user. The correlations between gestures and control commands associated with a certain human target may or may not be different from such correlations associated with another human target.

In some embodiments, memory 118 includes a spatial relationship determination module 405. Spatial relationship determination module 405 calculates one or more spatial relationships between target 106 and movable object 102. In some embodiments, the spatial relationships between target 106 and movable object 102 include a horizontal distance between target 106 and movable object 102 and/or a pitch angle between target 106 and movable object 102.

In some embodiments, memory 118 stores target information 408. In some embodiments, target information 408 is received by movable object 102 (e.g., via communication system 120) from control unit 104, computing device 126, target 106, and/or another movable object 102.

In some embodiments, target information 408 includes a time value and/or expiration time indicating a period of time during which the target 106 is to be tracked. In some embodiments, target information 408 includes a flag indicating whether a targeting information entry includes specific target information 412 and/or target type information 410.

In some embodiments, target information 408 includes target type information 410 such as color, texture, pattern, size, shape, and/or dimension. In some embodiments, target type information includes, but is not limited to, a predetermined recognizable object type and a general object type as identified by image analysis module 406. In some embodiments, target type information 410 includes features or characteristics for each type of target and is preset and stored in memory 118. In some embodiments, target type information 410 is, e.g., provided by a user to a user input device, such as a user input device of control unit 104. In some embodiments, the user may select a pre-existing target pattern or type (e.g., a black object or a round object with a radius greater or less than a certain value).

In some embodiments, target information 408 includes tracked target information 412 for a specific target 106 being tracked. Target information 408 may be identified by image analysis module 406 by analyzing the target in a capture image. Tracked target information 412 includes, e.g., an image of target 106, an initial position (e.g., location coordinates, such as pixel coordinates within an image) of target 106, and/or a size of target 106 within one or more images (e.g., images captured by imaging device 214 of payload 110). A size of target 106 is stored, e.g., as a length (e.g., mm or other length unit), an area (e.g., $mm^2$ or other area unit), a number of pixels in a line (e.g., indicating a length, width, and/or diameter), a ratio of a length of a representation of the target in an image relative to a total image length (e.g., a percentage), a ratio of an area of a representation of the target in an image relative to a total image area (e.g., a percentage), a number of pixels indicating an area of target 106, and/or a corresponding spatial relationship (e.g., a vertical distance and/or a horizontal distance) between target 106 and movable object 102 (e.g., an area of target 106 changes based on a distance of target 106 from movable object 102).

In some embodiments, one or more features (e.g., characteristics) of target 106 are determined from an image of target 106 (e.g., using image analysis techniques on images captured by imaging device 112). For example, one or more features of target 106 are determined from an orientation and/or part or all of identified boundaries of target 106. In some embodiments, tracked target information 412 includes pixel coordinates and/or pixel counts to indicate, e.g., a size parameter, position, and/or shape of a target 106. In some embodiments, one or more features of the tracked target information 412 are to be maintained as movable object 102 tracks target 106 (e.g., the tracked target information 412 are to be maintained as images of target 106 are captured by imaging device 214). Tracked target information 412 is used, e.g., to adjust movable object 102, carrier 108, and/or imaging device 214, e.g., such that the specified features of target 106 are substantially maintained. In some embodiments, tracked target information 412 is determined based on one or more of target type 410.

In some embodiments, memory 118 also includes predetermined recognizable target type information 414. Predetermined recognizable target type information 414 specifies one or more characteristics of a certain predetermined recognizable target type (e.g., type 1, type 2 . . . type n). Each predetermined recognizable target type may include one or more characteristics such as a size parameter (e.g., area, diameter, height, length and/or width), position (e.g., relative to an image center and/or image boundary), movement (e.g., speed, acceleration, altitude) and/or shape. In one example, type 1 may be a human target. One or more characteristics associated with a human target may include a height in a range from about 1.5 meters to about 2 meters, a pattern comprising a human head, a human torso, and human limbs, and/or a moving speed in a range from about 2 kilometers/hour to about 25 kilometers/hour. In another example, type 2 may be a car target. One or more characteristics associated with a car target may include a height in a range from about 1.4 meters to about 4.5 meters, a length in a range from about 3 meters to about 10 meters, a moving speed of 5 kilometers/hour to about 140 kilometers/hour, and/or a pattern of a sedan, a SUV, a truck, or a bus. In yet another example, type 3 may be a ship target. Other types of predetermined recognizable target object may also include airplane target, animal target, etc. Each type may further include one or more subtypes that include more specific characteristics for each subtype. The characteristics of each subtype may provide more accurate target classification results.

In some embodiments, target information 408 (including, e.g., target type information 410 and information for a tracked target 412), and/or predetermined recognizable target information 414 is generated based on user input, such as input received at user input device 506 (shown in FIG. 5) of control unit 104. Additionally or alternatively, target information is generated based on data from sources other than control unit 104. For example, target type information 410 may be based on stored previous images of target 106 (e.g., images captured by imaging device 214 and stored by memory 118), other data stored by memory 118, and/or data from data stores that are remote from control unit 104 and/or movable object 102. In some embodiments, target type information 410 is generated using a computer-generated image of target 106.

In some embodiments, target information 408 is used by movable object 102 to track target 106. For example, target information 408 is used by tracking module 404. In some embodiments, target information 408 is used by an image analysis module 406 to identify and/or classify target 106. In some cases, target identification involves image recognition and/or matching algorithms based on, e.g., CAD-like object models, appearance-based methods, feature-based methods, and/or genetic algorithms. In some embodiments, target identification includes comparing two or more images to determine, extract, and/or match features contained therein.

The above identified modules or programs (i.e., sets of instructions) need not be implemented as separate software programs, procedures or modules, and thus various subsets of these modules may be combined or otherwise re-arranged in various embodiments. In some embodiments, memory 118 may store a subset of the modules and data structures identified above. Furthermore, memory 118 may store additional modules and data structures not described above. In some embodiments, the programs, modules, and data structures stored in memory 118, or a non-transitory computer readable storage medium of memory 118, provide instructions for implementing respective operations in the methods described below. In some embodiments, some or all of these modules may be implemented with specialized hardware circuits that subsume part or all of the module functionality. One or more of the above identified elements may be executed by one or more processors 116 of movable object 102. In some embodiments, one or more of the above identified elements is executed by one or more processors of a device remote from movable object 102, such as control unit 104 and/or computing device 126.

Figure 5:
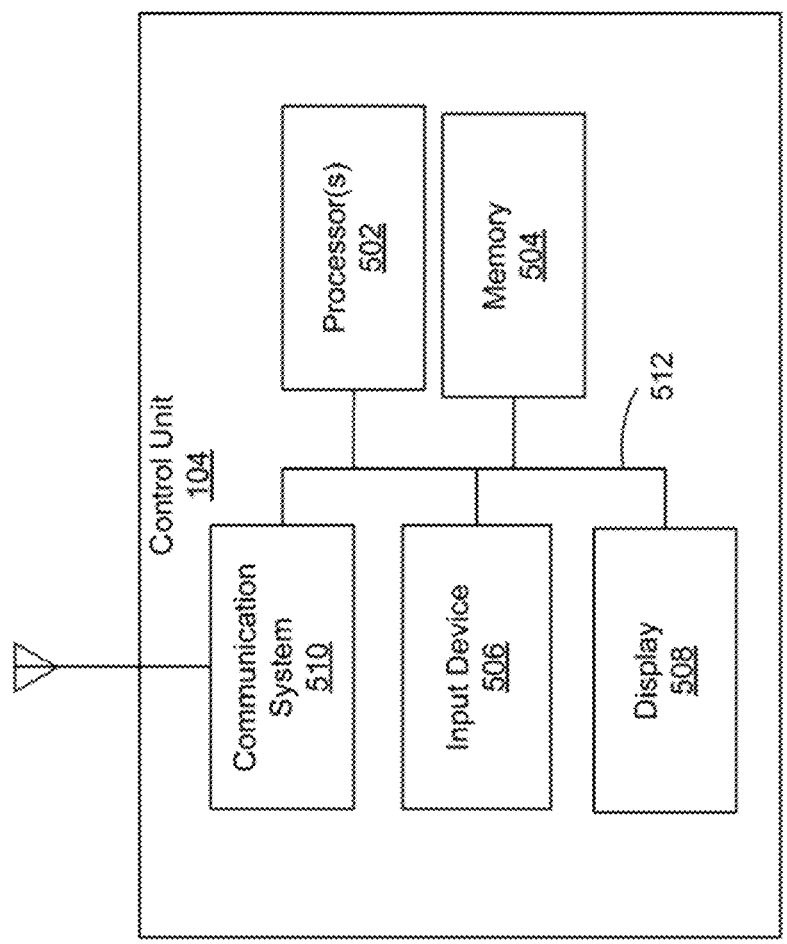
FIG. 5 illustrates an exemplary control unit of a target tracking system, in accordance with some embodiments.

FIG. 5 illustrates an exemplary control unit 104 of target tracking system 100, in accordance with some embodiments. In some embodiments, control unit 104 communicates with movable object 102 via communication system 120, e.g., to provide control instructions to movable object 102. Although control unit 104 is typically a portable (e.g., handheld) device, control unit 104 need not be portable. In some embodiments, control unit 104 is a dedicated control device (e.g., dedicated to operation of movable object 102), a laptop computer, a desktop computer, a tablet computer, a gaming system, a wearable device (e.g., watches, glasses, gloves, and/or helmet), a microphone, and/or a combination thereof.

Control unit 104 typically includes one or more processing units 502, a communication system 510 (e.g., including one or more network or other communications interfaces), memory 504, one or more input/output (I/O) interfaces (e.g., display 506 and/or input device 508) and one or more communication buses 512 for interconnecting these components.

In some embodiments, a touchscreen display includes display 508 and input device 506. A touchscreen display optionally uses LCD (liquid crystal display) technology, LPD (light emitting polymer display) technology, or LED (light emitting diode) technology, although other display technologies are used in other embodiments. A touchscreen display and processor(s) 502 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touchscreen display.

In some embodiments, input device 506 includes, e.g., one or more joysticks, switches, knobs, slide switches, buttons, dials, keypads, keyboards, mice, audio transducers (e.g., microphones for voice control systems), motion sensors, and/or gesture controls. In some embodiments, an I/O interface of control unit 104 includes sensors (e.g., GPS sensors, and/or accelerometers), audio output transducers (e.g., speakers), and/or one or more tactile output generators for generating tactile outputs.

In some embodiments, input device 506 receives user input to control aspects of movable object 102, carrier 108, payload 110, or a component thereof. Such aspects include, e.g., attitude, position, orientation, velocity, acceleration, navigation, and/or tracking. For example, input device 506 is manually set by a user to one or more positions, each of the positions corresponding to a predetermined input for controlling movable object 102. In some embodiments, input device 506 is manipulated by a user to input control instructions for controlling the navigation of movable object 102. In some embodiments, input device 506 is used to input a flight mode for movable object 102, such as auto pilot or navigation according to a predetermined navigation path.

In some embodiments, input device 506 is used to input a target tracking mode for movable object 102, such as a manual tracking mode or an automatic tracking mode. In some embodiments, the user controls movable object 102, e.g., the position, attitude, and/or orientation of movable object 102, by changing a position of control unit 104 (e.g., by tilting or otherwise moving control unit 104). For example, a change in a position of control unit 104 is detected by, e.g., one or more inertial sensors and output of the one or more inertial sensors is used to generate command data. In some embodiments, input device 506 is used to adjust an operational parameter of the payload, such as a parameter of a payload sensing system 212 (e.g., to adjust a zoom parameter of imaging device 214) and/or a position of payload 110 relative to carrier 108 and/or movable object 102.

In some embodiments, input device 506 is used to indicate information about target 106, e.g., to select a target 106 to track and/or to indicate target type information 412. In some embodiments, input device 506 is used for interaction with augmented image data. For example, an image displayed by display 508 includes representations of one or more targets 106. In some embodiments, representations of the one or more targets 106 are augmented to indicate identified objects for potential tracking and/or a target 106 that is currently being tracked. Augmentation includes, for example, a graphical tracking indicator (e.g., a box) adjacent to or surrounding a respective target 106. In some embodiments, input device 506 is used to select a target 106 to track or to change from a target 106 being tracked to a different target for tracking. In some embodiments, a target 106 is selected when an area corresponding to a representation of target 106 is selected by e.g., a finger, stylus, mouse, joystick, or other component of input device 506. In some embodiments, specific target information 412 is generated when a user selects a target 106 to track.

The control unit 104 may also be configured to allow a user to enter target information using any suitable method. In some embodiments, input device 506 receives a selection of a target 106 from one or more images (e.g., video or snapshot) displayed by display 508. For example, input device 506 receives input including a selection performed by a gesture around target 106 and/or a contact at a location corresponding to target 106 in an image. In some embodiments, computer vision or other techniques are used to determine a boundary of a target 106. In some embodiments, input received at input device 506 defines a boundary of target 106. In some embodiments, multiple targets are simultaneously selected. In some embodiments, a selected target is displayed with a selection indicator (e.g., a bounding box) to indicate that the target is selected for tracking. In some other embodiments, input device 506 receives input indicating information such as color, texture, shape, dimension, and/or other characteristics associated with a target 106. For example, input device 506 includes a keyboard to receive typed input indicating target information 408.

In some embodiments, a control unit 104 provides an interface that enables a user to select (e.g., using input device 506) between a manual tracking mode and an automatic tracking mode. When the manual tracking mode is selected, the interface enables the user to select a target 106 to track. For example, a user is enabled to manually select a representation of a target 106 from an image displayed by display 508 of control unit 104. Specific target information 412 associated with the selected target 106 is transmitted to movable object 102, e.g., as initial expected target information.

In some embodiments, when the automatic tracking mode is selected, the user does not provide input selecting a target 106 to track. In some embodiments, input device 506 receives target type information 410 from user input. In some embodiments, movable object 102 uses the target type information 410, e.g., to automatically identify the target 106 to be tracked and/or to track the identified target 106.

Typically, manual tracking requires more user control of the tracking of the target and less automated processing or computation (e.g., image or target recognition) by processor(s) 116 of movable object 102, while automatic tracking requires less user control of the tracking process but more computation performed by processor(s) 116 of movable object 102 (e.g., by image analysis module 406). In some embodiments, allocation of control over the tracking process between the user and the onboard processing system is adjusted, e.g., depending on factors such as the surroundings of movable object 102, motion of movable object 102, altitude of movable object 102, system configuration 400 (e.g., user preferences), and/or available computing resources (e.g., CPU or memory) of movable object 102, control unit 104, and/or computing device 126. For example, relatively more control is allocated to the user when movable object is navigating in a relatively complex environment (e.g., with numerous buildings or obstacles or indoor) than when movable object is navigating in a relatively simple environment (e.g., wide open space or outdoor). As another example, more control is allocated to the user when movable object 102 is at a lower altitude than when movable object 102 is at a higher altitude. As a further example, more control is allocated to movable object 102 if movable object is equipped with a high-speed processor adapted to perform complex computations relatively quickly. In some embodiments, the allocation of control over the tracking process between user and movable object 102 is dynamically adjusted based on one or more of the factors described herein.

In some embodiments, control unit 104 includes an electronic device (e.g., a portable electronic device) and an input device 506 that is a peripheral device that is communicatively coupled (e.g., via a wireless and/or wired connection) and/or mechanically coupled to the electronic device. For example, control unit 104 includes a portable electronic device (e.g., a smartphone) and a remote control device (e.g., a standard remote control with a joystick) coupled to the portable electronic device. In this example, an application executed by the smartphone generates control instructions based on input received at the remote control device.

In some embodiments, the display device 508 displays information about movable object 102, carrier 108, and/or payload 110, such as position, attitude, orientation, movement characteristics of movable object 102, and/or distance between movable object 102 and another object (e.g., target 106 and/or an obstacle). In some embodiments, information displayed by display device 508 includes images captured by imaging device 214, tracking data (e.g., a graphical tracking indicator applied to a representation of target 106, such as a box or other shape around target 106 shown to indicate that target 106 is currently being tracked), and/or indications of control data transmitted to movable object 102. In some embodiments, the images including the representation of target 106 and the graphical tracking indicator are displayed in substantially real-time as the image data and tracking information are received from movable object 102 and/or as the image data is acquired.

The communication system 510 enables communication with communication system 120 of movable object 102, communication system 610 of computing device 126, and/or a base station (e.g., computing device 126) via a wired or wireless communication connection. In some embodiments, the communication system 510 transmits control instructions (e.g., navigation control instructions, target information, and/or tracking instructions). In some embodiments, the communication system 510 receives data (e.g., tracking data from payload imaging device 214, and/or data from movable object sensing system 122). In some embodiments, control unit 104 receives tracking data (e.g., via wireless communications 124) from movable object 102. Tracking data is used by control unit 104 to, e.g., display target 106 as the target is being tracked. In some embodiments, data received by control unit 104 includes raw data (e.g., raw sensing data as acquired by one or more sensors) and/or processed data (e.g., raw data as processed by, e.g., tracking module 404).

In some embodiments, memory 504 stores instructions for generating control instructions automatically and/or based on input received via input device 506. The control instructions include, e.g., control instructions for operating movement mechanisms 114 of movable object 102 (e.g., to adjust the position, attitude, orientation, and/or movement characteristics of movable object 102, such as by providing control instructions to actuators 132). In some embodiments, the control instructions adjust movement of movable object 102 with up to six degrees of freedom. In some embodiments, the control instructions are generated to initialize and/or maintain tracking of a target 106 (e.g., as described further with regard to FIG. 7). In some embodiments, control instructions include instructions for adjusting carrier 108 (e.g., instructions for adjusting damping element 208, actuator 204, and/or one or more sensors of carrier sensing system 206 of carrier 108). In some embodiments, control instructions include instructions for adjusting payload 110 (e.g., instructions for adjusting one or more sensors of payload sensing system 212). In some embodiments, control instructions include control instructions for adjusting the operations of one or more sensors of movable object sensing system 122.

In some embodiments, memory 504 also stores instructions for performing image recognition, target classification, spatial relationship determination, and/or gesture analysis that are similar to the corresponding functionalities discussed with regard to FIG. 4. Memory may also store target information, such as tracked target information and/or predetermined recognizable target type information as discussed in FIG. 4.

In some embodiments, input device 506 receives user input to control one aspect of movable object 102 (e.g., the zoom of the imaging device 214) while a control application generates the control instructions for adjusting another aspect of movable object 102 (e.g., to control one or more movement characteristics of movable object 102). The control application includes, e.g., control module 402, tracking module 404 and/or a control application of control unit 104 and/or computing device 126. For example, input device 506 receives user input to control one or more movement characteristics of movable object 102 while the control application generates the control instructions for adjusting a parameter of imaging device 214. In this manner, a user is enabled to focus on controlling the navigation of movable object without having to provide input for tracking the target (e.g., tracking is performed automatically by the control application).

In some embodiments, allocation of tracking control between user input received at input device 506 and the control application varies depending on factors such as, e.g., surroundings of movable object 102, motion of movable object 102, altitude of movable object 102, system configuration (e.g., user preferences), and/or available computing resources (e.g., CPU or memory) of movable object 102, control unit 104, and/or computing device 126. For example, relatively more control is allocated to the user when movable object is navigating in a relatively complex environment (e.g., with numerous buildings or obstacles or indoor) than when movable object is navigating in a relatively simple environment (e.g., wide open space or outdoor). As another example, more control is allocated to the user when movable object 102 is at a lower altitude than when movable object 102 is at a higher altitude. As a further example, more control is allocated to movable object 102 if movable object 102 is equipped with a high-speed processor adapted to perform complex computations relatively quickly. In some embodiments, the allocation of control over the tracking process between user and movable object is dynamically adjusted based on one or more of the factors described herein.

Figure 6:
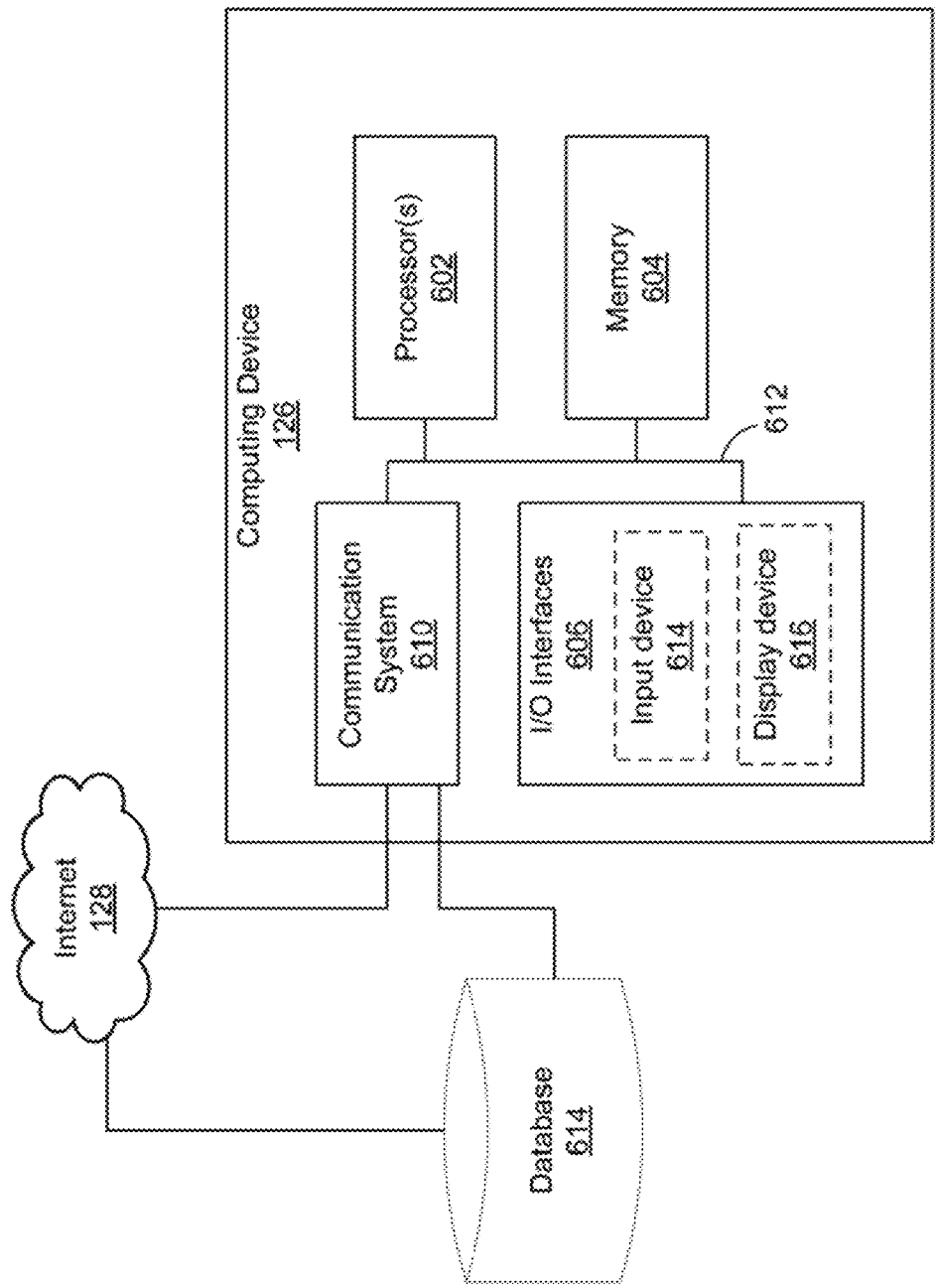
FIG. 6 illustrates an exemplary computing device for controlling a movable object, in accordance with some embodiments.

FIG. 6 illustrates an exemplary computing device 126 for controlling movable object 102, in accordance with embodiments. Computing device 126 is, e.g., a server computer, laptop computer, desktop computer, tablet, or phone. Computing device 126 typically includes one or more processing units 602, memory 604, communication system 610 and one or more communication buses 612 for interconnecting these components. In some embodiments, computing device 126 includes input/output (I/O) interfaces 606, e.g., display 614 and/or input device 616.

In some embodiments, computing device 126 is a base station that communicates (e.g., wirelessly) with movable object 102 and/or control unit 104.

In some embodiments, computing device 126 provides data storage, data retrieval, and/or data processing operations, e.g., to reduce the processing power and/or data storage requirements of movable object 102 and/or control unit 104. For example, computing device 126 is communicatively connected to a database (e.g., via communication 610) and/or computing device 126 includes database (e.g., database is connected to communication bus 612).

Communication system 610 includes one or more network or other communications interfaces. In some embodiments, computing device 126 receives data from movable object 102 (e.g., from one or more sensors of movable object sensing system 122) and/or control unit 104. In some embodiments, computing device 126 transmits data to movable object 102 and/or control unit 104. For example, computing device provides control instructions to movable object 102.

In some embodiments, memory 604 stores instructions for performing image recognition, target classification, spatial relationship determination, and/or gesture analysis that are similar to the corresponding functionalities discussed with regard to FIG. 4. Memory 604 may also store target information, such as tracked target information and/or predetermined recognizable target type information as discussed in FIG. 4.

Figure 7:
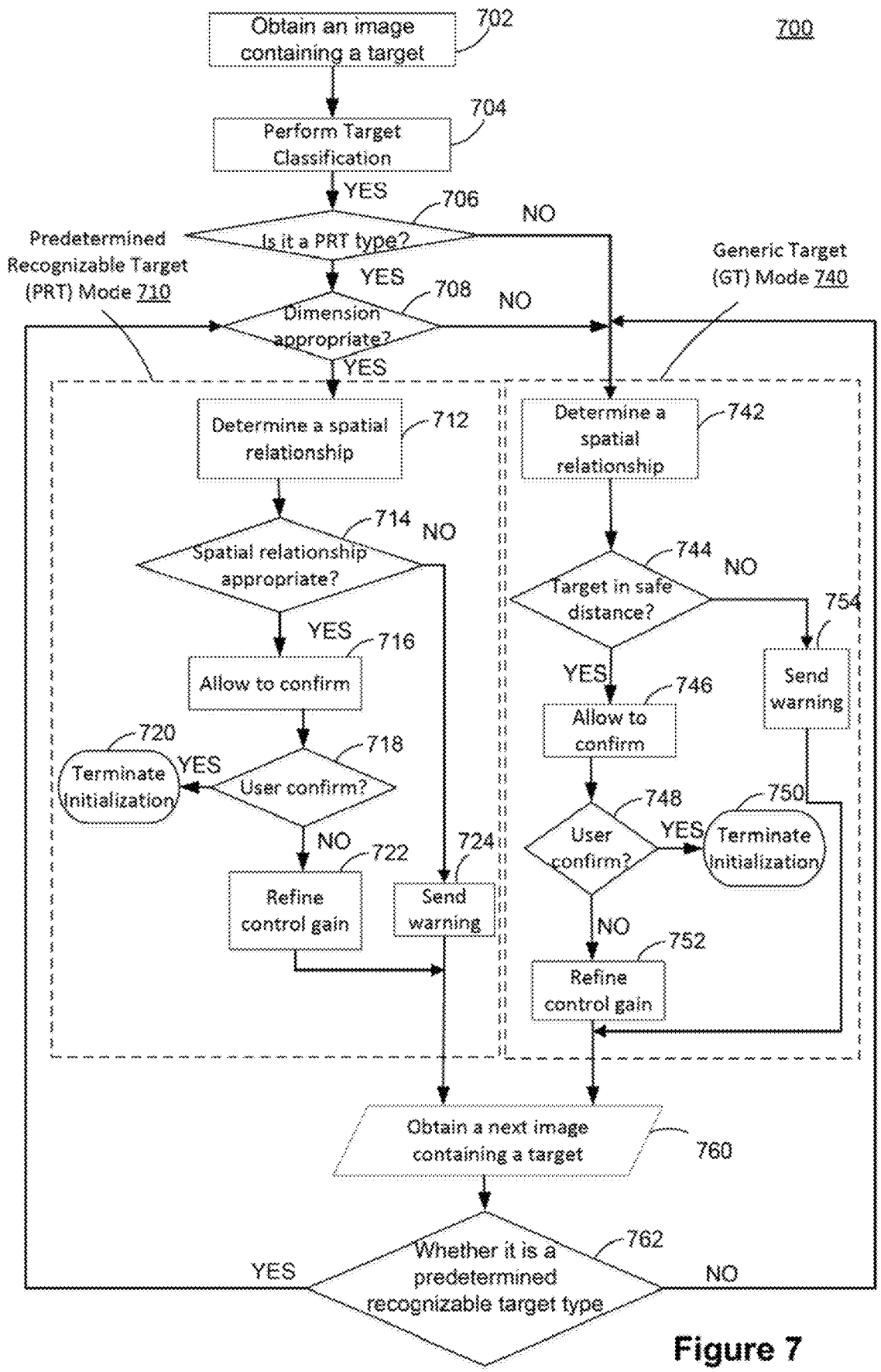
FIG. 7 is a flow diagram illustrating a method for performing initialization for target tracking, in accordance with some embodiments.

FIG. 7 is a flow diagram illustrating a method 700 for performing initialization for target tracking, in accordance with some embodiments. The method 700 is performed at a device or a system including one or more devices, such as moving object 102, control unit 104 and/or computing device 126.

The system obtains (702) an image frame captured by imaging device 214 borne by movable object 102. In some embodiments, imaging device 214 captures an image, and target 106 may be identified by a user when the user views the captured image on a device, e.g., display 508 and/or display 616. For example, the user may tap, circle, click, or use any other suitable interaction method (e.g., using a gesture) to indicate the user interest in target 106 contained in the image frame. User input may be received from input device 506 and/or input device 614. In some embodiments, more than one target 106 may be contained in the image frame. In some embodiments, target 106 is displayed with a selection indicator (e.g., a bounding box) to indicate that the target is selected by the user.

In some embodiments, a user may first provide some target information, e.g., location information of target 106. Such target information may be provided using any input device as discussed herein. Movable object 102 and/or carrier 108 may be adjusted manually or automatically by motion control module 402 to point imaging device 214 to a direction of target 106 based on the provided target information. In some embodiments, one or more sensors of movable object sensing system 122 may be used independently or in combination with imaging device 214 to identify target 106. Imaging device 214 may then capture an image containing target 106. The user may further identify/confirm target 106 in the captured image when the user views the image displayed on a device as discussed elsewhere herein.

The system performs (704) target classification. In some embodiments, the system extracts one or more features of target 106 in the captured image. In some embodiments, target information 408, such as target type 410 and/or tracked target information 412, may be identified by image analysis module(s) (e.g., image analysis module 406 and/or similar image analysis modules at memory 504 and/or memory 604) based on the extracted features. In some embodiments, target information 408 may be obtained from memory 118 of movable object 102, memory 504 of control unit 104, and/or memory 604 of computing device 126.

In some embodiments, image analysis module(s), such as image analysis module 406 and/or similar image analysis modules at memory 504 and/or memory 604, perform image recognition or identification techniques to identify target 106 based on extracted target information 408. In some embodiments, the system may identify a type (e.g., or a category) of target 106. For example, target 106 may be identified to be a moving object or a still object. Target 106 may be identified to be a human, an animal, a car, a ship, or any other suitable object type. In some embodiments, image analysis module(s) use neural network to perform image recognition and/or classification of object(s) included in the image. In some embodiments, the system performs target classification automatically. In some embodiments, one or more steps of target classification may be performed manually by the user. In one example, the user may use input device to indicate a type of target 106. In another example, the system may present more than one target type candidate identified via image analysis to the user, and the user may select a certain type to be associated with target 106.

The system determines (706) whether target 106 is a predetermined recognizable target (e.g., PRT) type as previously stored. For example, one or more predetermined recognizable target types and the corresponding characteristics are stored at memory 118 of movable object 102, memory 504 of control unit 104, and/or memory 604 of computing device 126 as discussed elsewhere herein. In some embodiments, image analysis module(s), such as image analysis module 406 and/or similar image analysis modules at memory 504 and/or memory 604, compare the extracted features with one or more characteristics associated with a predetermined individual type of predetermined recognizable target type information 414. The comparison result between the one or more features of target 106 and the one or more characteristics of a certain predetermined recognizable target type may be assigned a matching score. Target 106 may be identified to be a certain predetermined recognizable target type, e.g., a human target, based on a highest matching score. In one example, the pattern (or shape), the height, and/or the speed of target 106 may be determined to be similar to a human pattern, within a height range, and within a speed range of a human target type stored at predetermined recognizable target type information 414. Target 106 is thus determined to be a human target as a predetermined recognizable target type.

When the system determines that target 106 is a certain predetermined recognizable target type, the system determines (708) whether a dimension of target 106 satisfies requirements for targeting tracking associated with a predetermined recognizable target type. For example, the system compares the dimension of target 106 with a first predetermined threshold value. When the dimension of target 106 is lower than the first predetermined threshold value, the system may not be able to obtain accurate or sufficient target information to perform automatic target tracking accurately. In some embodiments, when the dimension of target 106 is greater than a second predetermined threshold value (which is larger than the first predetermined threshold value), the system may not be able to obtain accurate target information to perform automatic target tracking accurately due to the large target dimension. In some embodiments, the system determines a length, a height, a width, a thickness, a diameter, an area, and/or any other suitable dimensional factor of target 106. In some embodiments, the system determines the dimension of target 106 using pixel information as discussed with reference to FIG. 4. In some embodiments, the predetermined threshold may be a predetermined minimum number of pixels on a captured image. In some embodiments, the predetermined threshold value may or may not be different for different types of target as identified in step 706.

When the system determines that the dimension of target 106 in the captured image is appropriate for automatic target tracking, the system enters a mode 710 for initiating target tracking associated with the identified predetermined recognizable target (PRT) type (e.g., using PRT mode 710). For example, one or more characteristics associated with the identified predetermined recognizable target type are used during the initiation process for target tracking and/or the target tracking process.

In some alternative embodiments, step 708 is optional in method 700. For instance, when the system determines (706) that target 106 is a certain predetermined recognizable target type, the system enters the PRT mode 710. The system initiates the target tracking features associated with the identified predetermined recognizable target type. For example, the system uses one or more characteristics (e.g., target size and/or target speed of predetermined recognizable target type information 414) associated with the identified predetermined recognizable target type in the initiation process for target tracking and/or the target tracking process.

In PRT mode 710, the system determines (712) a spatial relationship between target 106 and movable object 102. In some embodiments, the spatial relationship is determined using one or more characteristics of the identified predetermined recognizable target type. For example, when target 106 is identified to be a human target, the system associates the target with a human with an average height of 1.7 meters based on predetermined recognizable target type information 414. Then based on the number of pixels on the captured image along a height dimension of the human target of about 1.7 meters high, the systems knows a real world size each pixel corresponds to. This information can be used for calculating and/or verifying the spatial relationship between target 106 and movable object 102. In some embodiments, the spatial relationship includes a horizontal distance between target 106 and movable object 102. In some embodiments, the spatial relationship includes a pitch angle to indicate a relative position relationship between target 106 and movable object 102. The pitch angle may be determined using a pitch angle of a gimbal borne by movable object 102 for carrying imaging device 214, and a target pitch angle of target 106 displayed on the captured image. In some embodiments, the spatial relationship may also include a height of movable object 102.

The system determines (714) whether the spatial relationship between target 106 and movable object 102 is appropriate for target tracking.

In one example, when movable object 102 is too high, e.g., higher than about 50 meters, the system may not be able to obtain sufficient pixel information of target 106 on the ground. But when movable object 102 is too low, e.g., lower than 2 meters, there could be safety concerns. Thus the system may maintain a suitable height range for target tracking. In some embodiments, the suitable horizontal distance range is determined based on the height of movable object 102. In some embodiments, the higher the movable object, the broader the suitable horizontal distance range. For example, when the height of movable object 102 is about 3 meters, the allowed horizontal distance range is from about 3 meters to about 10 meters. When the height of movable object 102 is about 20 meters, the allowed horizontal distance range is from about 0 meters to about 30 meters.

In another example, when the pitch angle is lower than a predetermined threshold value (e.g., about $-40°$), movable object 102 may not be able to obtain sufficient features of target in the captured image, thus target information may not be accurate for target tracking. To avoid so, the system may maintain a threshold value for the pitch angle. The one or more spatial relationship factors (e.g., horizontal distance, pitch angle, height, etc.) may be determined independently or in combination to determine whether the spatial relationship is sufficient at step 714.

In yet another example, when the horizontal distance between target 106 and movable object 102 is too large, the system may not be able to obtain sufficient pixel information of target 106 for target tracking. Nor should the horizontal distance be too small for safety concern. Thus the system may maintain a suitable horizontal distance range (e.g., a safe distance range or an allowed horizontal distance range).

When one or more spatial relationship factors are determined to be appropriate for target tracking, the system allows (716) the user to confirm initiating automatic target tracking in PRT mode. In some embodiments, the system sends a notification on a display device, such as display 508 of control unit 104 and/or display device 616 of computing device 126. The user of the display device can respond to the notification by confirming whether or not to enter the automatic target tracking mode through the display device 616, which generates a response and returns the response to the system. For example, the user may generate the response by tapping a touch screen, clicking a mouse, or using any other suitable interaction user input method to confirm initiating automatic target tracking.

Upon receipt of the response, the system determines (718) whether the user confirms to start automatic target tracking. When the system receives the user's confirmation to start automatic target tracking, the system terminates (720) the initiation process for automatic target tracking. The system proceeds to automatically track target 106 as the predetermined recognizable target type in PRT mode.

When the system does not receive user confirmation to start automatic target tracking, the system refines (722) control gain to keep tracking target 106 and capturing one or more subsequent images by imaging device 214. In some embodiments, the system (motion control module and/or tracking module located at movable object 102, control unit 104, and/or computing device 126) adjusts one or more control parameters of movable object 102 and/or carrier 108 based on the determined spatial relationship (e.g., the horizontal distance and/or the pitch angle) between target 106 and movable object 102. In some embodiments, the one or more control parameters may be adjusted based on one or more characteristics associated with the identified predetermined recognizable target type. For example, when target 106 is determined to be a human target, the speed of movable object 102 may be adjusted to be in sync with the moving speed of the human target.

In some embodiments, adjusting the one or more control parameters includes an adjustment of an orientation, position, attitude, and/or one or more movement characteristics of movable object 102, carrier 108, and/or payload 110. In some embodiments, instructions are generated to substantially changing a control parameter of imaging device 214 and/or one or more sensors of movable object sensing system 122, e.g., changing zoom, focus, or other characteristics associated with imaging device 214. In some embodiments, the instructions to refine control gain are generated using information from image data in combination with sensing data acquired by one or more sensors of movable object sensing system 122 (e.g., proximity sensor and/or GPS sensor) and/or position information transmitted by target 106 (e.g., GPS location).

In some embodiments, the system refines control gain by adjusting a zoom level of imaging device 214 (assuming that the imaging device supports the zoom level required), by adjusting one or more movement characteristics of movable object 102, or by a combination of adjusting a zoom level of imaging device 214 and adjusting one or more movement characteristics of movable object 102. In some embodiments, a control application (e.g., control module 402, tracking module 404 and/or a control application of control unit 104 and/or computing device 126) determines one or more adjustments. For example, if the imaging device 214 does not support a zoom level required to substantially track target 106, one or more movement characteristics of movable object 102 are adjusted instead of or in addition to adjusting the zoom level of imaging device 214.

In some embodiments, the adjustment of the orientation, position, attitude, one or more movement characteristics, and/or another operation parameter of movable object 102, carrier 108, and/or payload 110 is limited by one or more constraints imposed by system configuration 400 (e.g., as configured by a manufacturer, administrator, or user), by control unit 104 (e.g., user control input received at control unit 104), and/or by computing device 126. Examples of constraints include limits (e.g., maximum and/or minimum limits) for a rotation angle, angular velocity, and/or linear velocity along one or more axes. For example, the angular velocity of movable object 102, carrier 108, and/or payload 110 around an axis is constrained by, e.g., a maximum angular velocity that is allowed for movable object 102, carrier 108, and/or payload 110. In some embodiments, the linear velocity of movable object 102, carrier 108, and/or payload 110 is constrained by, e.g., a maximum linear velocity that is allowed for movable object 102, carrier 108, and/or payload 110. In some embodiments, adjustment of the focal length of imaging device 214 is constrained by a maximum and/or minimum focal length for imaging device 214.

When one or more spatial relationship factors (e.g., horizontal distance, pitch angle, height, etc.) are determined to be inappropriate for target tracking, the system does not start automatic target tracking. In some embodiments, the system sends (724) a warning indicator. The warning indicator includes text, audio (e.g., siren or beeping sound), images or other visual indicators (e.g., changed user interface background color and/or flashing light), and/or haptic feedback. A warning indicator is provided at, e.g., movable object 102, control unit 104, and/or computing device 126. For example, the warning indicator includes a text box showing "Target too close" or "Target too remote" to the user.

After the system refines (722) control gain or after the system sends (724) the warning indicator, the system obtains (760) a next image containing the target using imaging device 214. In some embodiments, the next image is an image captured after a certain period of time (e.g., 0.01 second, 0.1 second, 0.2 second, 0.5 second, or 1 second). In some embodiments, the next image is a subsequent image frame of a video, such as an immediately subsequent image frame, or an image frame after certain number of frames. In some embodiments, the next image contains the same target as target 106 in the previous image. In some embodiments, the next image contains a target different from the target contained in the previous image.

The system then determines (762) whether target 106 in the current image is a predetermined recognizable target type. In some embodiments, target 106 is determined to be the same recognizable target type as previously identified. In some embodiments, due to different target information captured in the current image, target 106 may be determined to be a different predetermined recognizable target type. Because position of movable object 102 and/or lens configuration of imaging device 214 may change from last image, the system proceeds to determine (708) the dimension of target 106 and to calculate (712) spatial relationship between target 106 and movable object 102. In some embodiments, when step 708 is not included in method 700, the system proceeds to enter PRT mode 710 to calculate (712) a spatial relationship 712 between target 106 and movable object 102.

In some embodiments, features of target 106 in the current image may not match with any characteristics of the predetermined recognizable target type information 414, the system associates target 106 with a generic target type. The system exits the PRT mode 710 and enters the GT mode 740 as discussed below.

In some embodiments, at step 706 or 762, when target 106 is not determined to be any predetermined recognizable target type (e.g., determined to not match any predetermined recognizable target type), the system enters a mode (740) for initiating target tracking associated with a generic target (GT) type (e.g., GT mode 740). In some embodiments where method 700 includes step 708, at step 708, when the system determines that the dimension of target 106 in the captured image is not appropriate for initiating automatic target tracking for the predetermined recognizable target, the system also enters GT mode 740.

In GT mode 740, the system determines (742) a spatial relationship between target 106 and movable object 102. In some embodiments, the spatial relationship includes one or more factors such as a horizontal distance between target 106 and movable object 102, a height of movable object 102, and a pitch angle. In some embodiments, the horizontal distance between target 106 and movable object 102 is determined using a triangulation method. For example, the horizontal distance may be calculated using a height of movable object 102 and a pitch angle between movable object 102 and target 106. The pitch angle may be determined using pitch movements of movable object 102, carrier 108, and/or payload 110. In some embodiments, the system determines a safe distance range based on the height of movable object 102. For example, when the height of movable object 102 is about 3 meters, the allowed horizontal distance range is from about 3 meters to about 10 meters. When the height of movable object 102 is about 20 meters, the allowed horizontal distance range is from about 0 meters to about 30 meters.

The system determines (744) whether the horizontal distance is within the determined safe distance range. When one or more spatial relationship factors are determined to be appropriate for target tracking, the system allows (746) the user to confirm initiating automatic target tracking in the GT mode. In some embodiments, the system sends a notification on a display device, such as display 508 of control unit 104 and/or display device 616 of computing device 126. The user then responds in a similar manner as described above in the PRT mode. For example, the user may tap a touch screen, click a mouse, or use any other suitable interaction user input method to confirm initiating automatic target tracking.

Upon receipt of the response, the system determines (748) whether the user confirms to start automatic target tracking. When the system receives the user's confirmation to start automatic target tracking, the system terminates (750) the initiation process for target tracking. The system proceeds to automatically track target 106 as a generic target type in GT mode.

When the system does not receive user confirmation to start automatic target tracking, the system refines (752) control gain to keep tracking target 106 and capturing one or more subsequent images by imaging device 214. In some embodiments, the system (motion control module and/or tracking module located at movable object 102, control unit 104, and/or computing device 126) adjusts one or more control parameters of movable object 102 and/or carrier 108 based on the determined spatial relationship (e.g., the horizontal distance and/or the pitch angle) between target 106 and movable object 102.

In some embodiments, adjusting the one or more control parameters includes an adjustment of an orientation, position, attitude, and/or one or more movement characteristics of movable object 102, carrier 108, and/or payload 110. In some embodiments, instructions are generated to substantially changing a control parameter of imaging device 214 and/or one or more sensors of movable object sensing system 122, e.g., changing zoom, focus, or other characteristics associated with imaging device 214. In some embodiments, the instructions to refine control gain are generated using information from image data in combination with sensing data acquired by one or more sensors of movable object sensing system 122 (e.g., proximity sensor and/or GPS sensor) and/or position information transmitted by target 106 (e.g., GPS location).

In some embodiments, the system refines control gain by adjusting a zoom level of imaging device 214 (e.g., if the imaging device supports the zoom level required), by adjustment of one or more movement characteristics of movable object 102, or by a combination of adjusting a zoom level of imaging device 214 and adjustment of one or more movement characteristics of movable object 102. In some embodiments, a control application (e.g., control module 402, tracking module 404 and/or a control application of control unit 104 and/or computing device 126) determines one or more adjustments. For example, if the imaging device 214 does not support a zoom level required to substantially track target 106, one or more movement characteristics of movable object 102 are adjusted instead of or in addition to adjusting the zoom level of imaging device 214.

As discussed elsewhere herein, in some embodiments, the adjustment of the orientation, position, attitude, one or more movement characteristics, and/or another operation parameter of movable object 102, carrier 108, and/or payload 110 is limited by one or more constraints imposed by system configuration 400 (e.g., as configured by a manufacturer, administrator, or user), by control unit 104 (e.g., user control input received at control unit 104), and/or by computing device 126.

When one or more spatial relationship factors (e.g., horizontal distance, pitch angle, height, etc.) are determined to be insufficient for target tracking, the system does not allow the user to start automatic target tracking. The system also sends (754) a warning indicator. In some embodiments, a warning indicator includes text, audio (e.g., siren or beeping sound), images or other visual indicators (e.g., changed user interface background color and/or flashing light), and/or haptic feedback. A warning indicator is provided at, e.g., movable object 102, control unit 104, and/or computing device 126. In one example, the warning indicator includes a text box showing "Target too far" or "Target to close" to the user.

After the system refines (752) control gain or after the system sends (754) the warning indicator, the system obtains (760) a next image containing a target using imaging device 214 as discussed elsewhere herein. The system then determines (762) whether the target (e.g., target 106) in the current image is a predetermined recognizable target type or not.

When target 106 in the current image is determined to be a predetermined recognizable target type, the system proceeds to determine (708) the dimension of target 106 and to calculate (712) spatial relationship between target 106 and movable object 102. When target 106 in the current image does not belong to any predetermined recognizable target type, the system associates target 106 with a generic target type and proceeds with GT mode 740 as discussed above.

Figure 8:
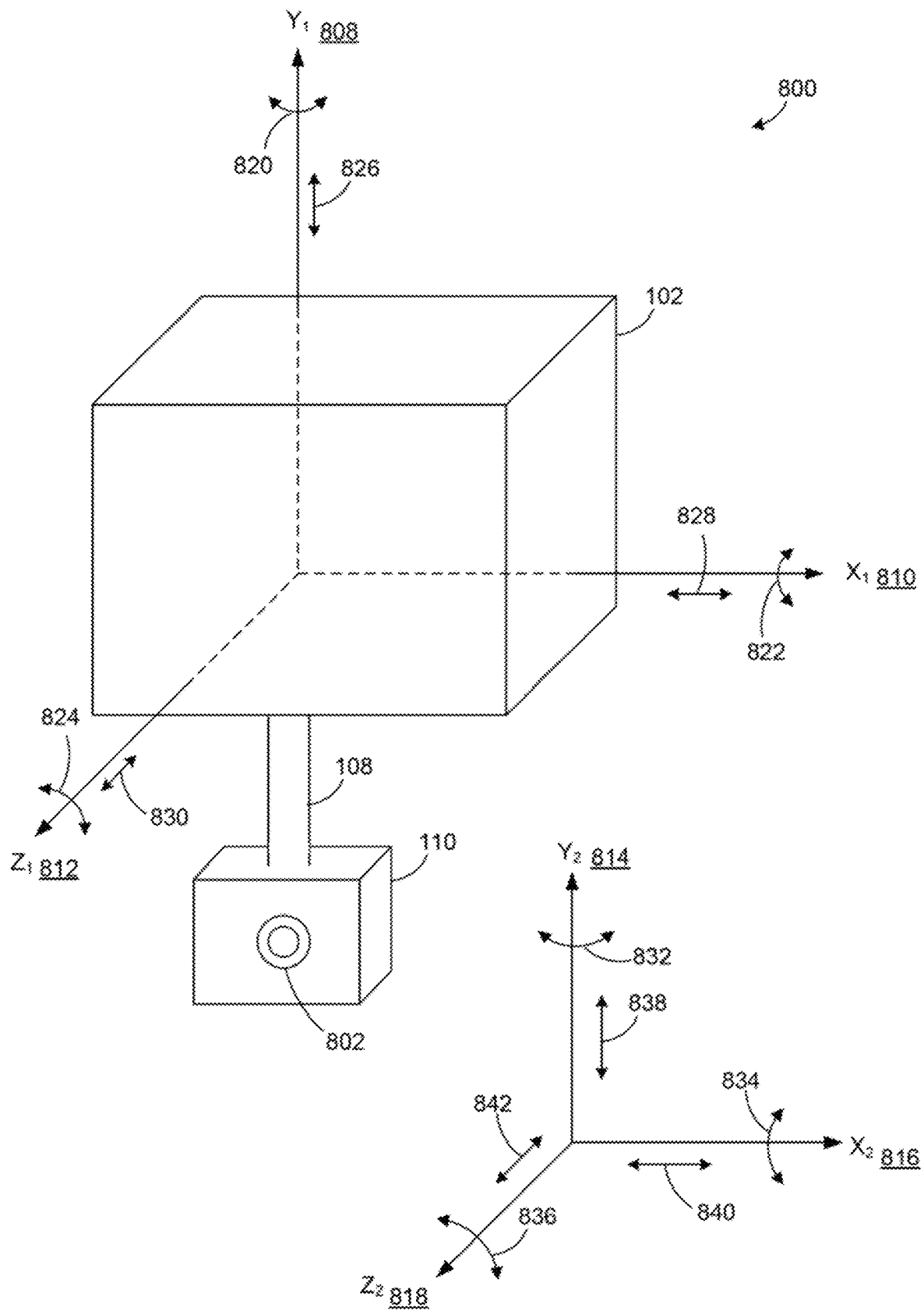
FIG. 8 illustrates an exemplary configuration of a movable object, carrier, and payload, in accordance with some embodiments.

FIG. 8 illustrates an exemplary configuration 800 of a movable object 102, carrier 108, and payload 110, in accordance with embodiments. The configuration 800 is used to illustrate exemplary adjustments to an orientation, position, attitude, and/or one or more movement characteristics of movable object 102, carrier 108, and/or payload 110, e.g., as used to perform initialization of target tracking and/or to track target 106.

In some embodiments, movable object 102 rotates around up to three orthogonal axes, such as $X_1$ (pitch) 810, $Y_1$ (yaw) 808 and $Z_1$ (roll) 812 axes. Rotations around the three axes are referred to herein as pitch rotation 822, yaw rotation 820, and roll rotation 824, respectively. Angular velocities of movable object 102 around the $X_1$, $Y_1$, and $Z_1$ axes are referred to herein as $\omega_{X1}$, $\omega_{Y1}$, and $\omega^{Z1}$, respectively. In some embodiments, movable object 102 engages in translational movements 828, 826, and 830 along the $X_1$, $Y_1$, and $Z_1$ axes, respectively. Linear velocities of movable object 102 along the $X_1$, $Y_1$, and $Z_1$ axes are referred to herein as $V_{X1}$, $V_{Y1}$, and $V_{Z1}$, respectively.

In some embodiments, payload 110 is coupled to movable object 102 via carrier 108. In some embodiments, payload 110 moves relative to movable object 102 (e.g., payload 110 is caused by actuator 204 of carrier 108 to move relative to movable object 102).

In some embodiments, payload 110 moves around and/or along up to three orthogonal axes, $X_2$ (pitch) 816, $Y_2$ (yaw) 814 and $Z_2$ (roll) 818. The $X_2$, $Y_2$, and $Z_2$ axes are respectively parallel to the $X_1$, $Y_1$, and $Z_1$ axes. In some embodiments, where payload 110 includes imaging device 214 (e.g., including an optical module 802), the roll axis $Z_2$ 818 is substantially parallel to an optical path or optical axis for optical module 802. In some embodiments, optical module 802 is optically coupled to image sensor 216 (and/or one or more sensors of movable object sensing system 122). In some embodiments, carrier 108 causes payload 110 to rotate around up to three orthogonal axes, $X_2$ (pitch) 816, $Y_2$ (yaw) 814 and $Z_2$ (roll) 818, e.g., based on control instructions provided to actuator 204 of carrier 108. The rotations around the three axes are referred to herein as the pitch rotation 834, yaw rotation 832, and roll rotation 836, respectively. The angular velocities of payload 110 around the $X_2$, $Y_2$, and $Z_2$ axes are referred to herein as $\omega_{X2}$, $\omega_{Y2}$, and $\omega_{Z2}$, respectively. In some embodiments, carrier 108 causes payload 110 to engage in translational movements 840, 838, and 842, along the $X_2$, $Y_2$, and $Z_2$ axes, respectively, relative to movable object 102. The linear velocity of payload 110 along the $X_2$, $Y_2$, and $Z_2$ axes is referred to herein as $V_{X2}$, $V_{Y2}$, and $V_{Z2}$, respectively.

In some embodiments, the movement of payload 110 may be restricted (e.g., carrier 108 restricts movement of payload 110, e.g., by constricting movement of actuator 204 and/or by lacking an actuator capable of causing a particular movement).

In some embodiments, the movement of payload 110 may be restricted to movement around and/or along a subset of the three axes $X_2$, $Y_2$, and $Z_2$ relative to movable object 102. For example, payload 110 is rotatable around $X_2$, $Y_2$, $Z_2$ (movements 832, 834, 836) or any combination thereof, payload 110 is not movable along any of the axes (e.g., carrier 108 does not permit payload 110 to engage in movements 838, 840, 842). In some embodiments, payload 110 is restricted to rotation around one of the $X_2$, $Y_2$, and $Z_2$ axes. For example, payload 110 is only rotatable about the $Y_2$ axis (e.g., rotation 832). In some embodiments, payload 110 is restricted to rotation around only two of the $X_2$, $Y_2$, and $Z_2$ axes. In some embodiments, payload 110 is rotatable around all three of the $X_2$, $Y_2$, and $Z_2$ axes.

In some embodiments, payload 110 is restricted to movement along $X_2$, $Y_2$, or $Z_2$ axis (movements 838, 840, 842), or any combination thereof, and payload 110 is not rotatable around any of the axes (e.g., carrier 108 does not permit payload 110 to engage in movements 832, 834, 836). In some embodiments, payload 110 is restricted to movement along only one of the $X_2$, $Y_2$, and $Z_2$ axes. For example, movement of payload 110 is restricted to movement 840 along the $X_2$ axis). In some embodiments, payload 110 is restricted to movement along only two of the $X_2$, $Y_2$, and $Z_2$ axes. In some embodiments, payload 110 is movable along all three of the $X_2$, $Y_2$, and $Z_2$ axes.

In some embodiments, payload 110 is able to perform both rotational and translational movement relative to movable object 102. For example, payload 110 is able to move along and/or rotate around one, two, or three of the $X_2$, $Y_2$, and $Z_2$ axes.

In some embodiments, payload 110 is coupled to movable object 102 directly without a carrier 108 or carrier 108 does not permit payload 110 to move relative to movable object 102. In some embodiments, the attitude, position and/or orientation of payload 110 is fixed relative to movable object 102 in such cases.

In some embodiments, adjustment of attitude, orientation, and/or position of payload 110 is performed by adjustment of movable object 102, carrier 108, and/or payload 110, such as an adjustment of a combination of two or more of movable object 102, carrier 108, and/or payload 110. For example, a rotation of 60 degrees around a given axis (e.g., yaw axis) for the payload is achieved by a 60-degree rotation by movable object alone, a 60-degree rotation by the payload relative to movable object as effectuated by the carrier, or a combination of 40-degree rotation by movable object and a 20-degree rotation by the payload relative to movable object.

In some embodiments, a translational movement for the payload is achieved via adjustment of movable object 102, carrier 108, and/or payload 110 such as an adjustment of a combination of two or more of movable object 102, carrier 108, and/or payload 110. In some embodiments, a desired adjustment is achieved by adjustment of an operational parameter of the payload, such as an adjustment of a zoom level or a focal length of imaging device 214.

Figure 9B:
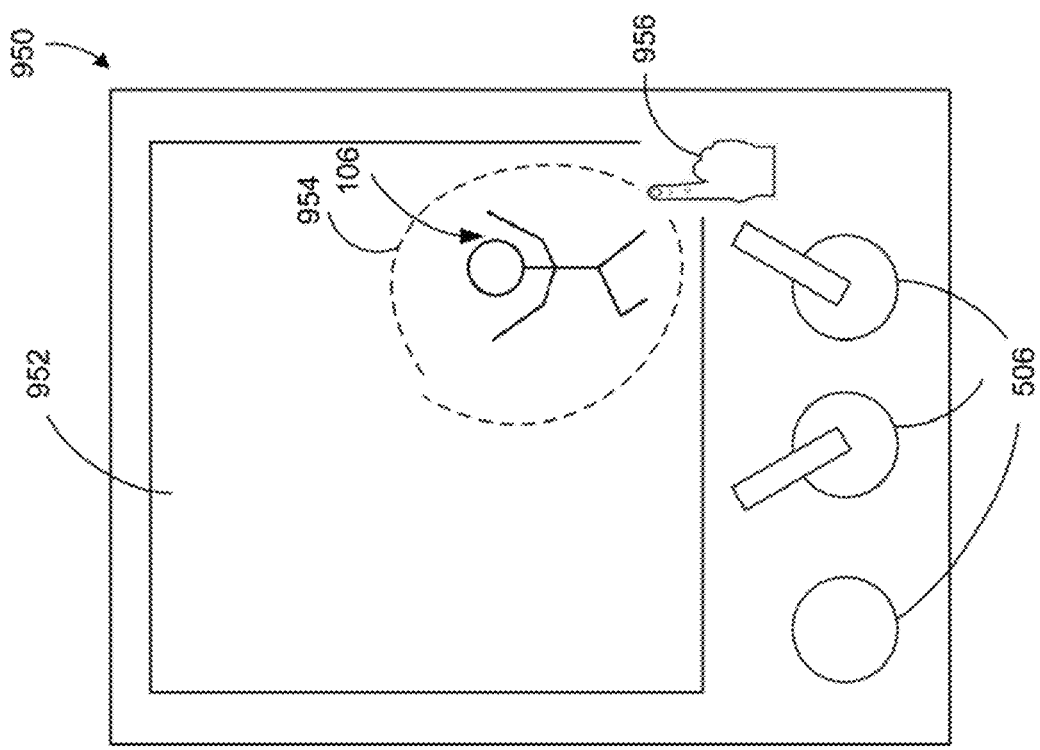
FIGS. 9B-9C illustrate an image containing a target displayed on a user interface 950, in accordance with embodiments
Figure 9A:
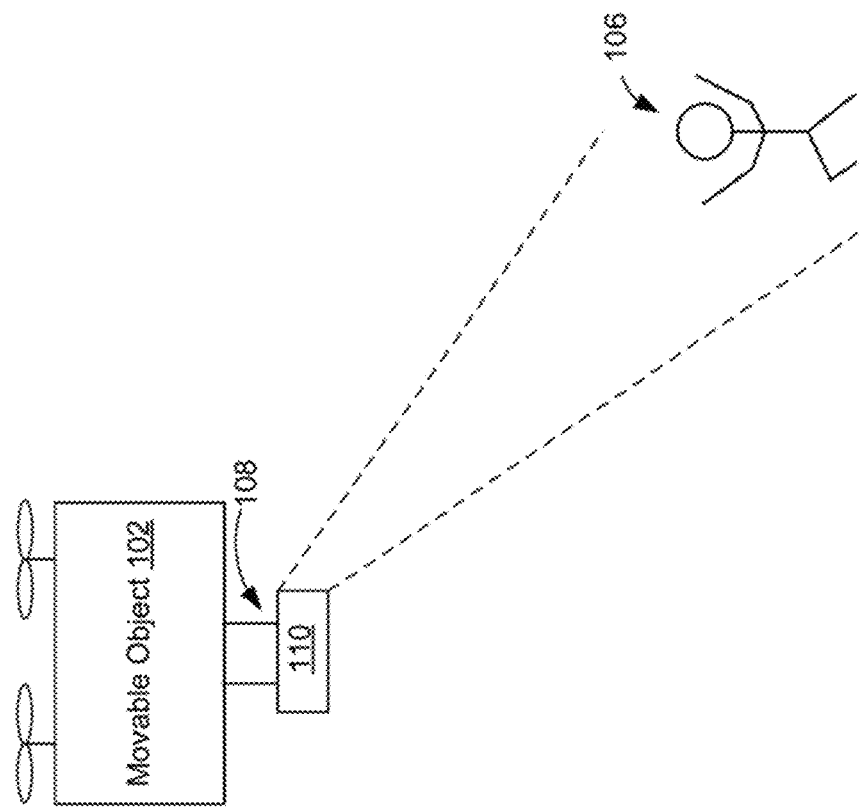
FIG. 9A illustrates an exemplary initialization process for tracking a target, in accordance with some embodiments.
Figure 9C:
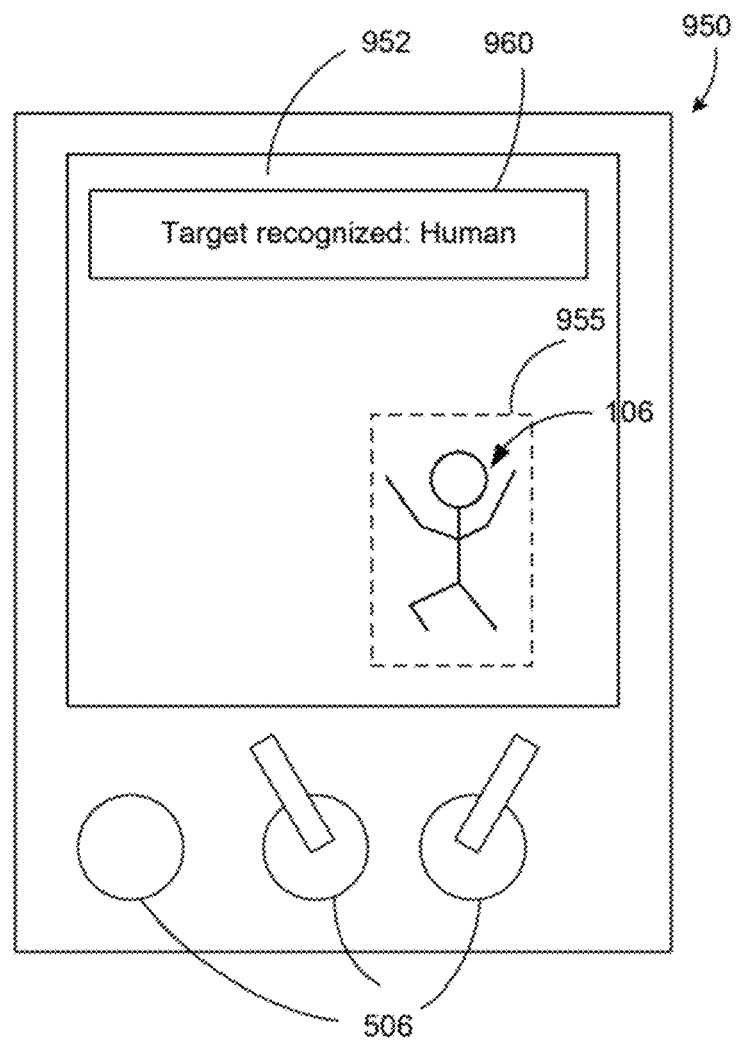

FIG. 9A illustrates an exemplary initialization process for tracking target 106, in accordance with some embodiments. FIGS. 9B-9C illustrate an image 952 containing target 106 displayed on a user interface 950, in accordance with embodiments. In some embodiments, imaging device 214 borne by payload 110 of movable object 102 captures image 952 as displayed in FIGS. 9B-9C. In some embodiments, user interface 950 may be used for selecting and/or initializing tracking of target 106. In some embodiments, user interface 950 is displayed by a control unit 104 and/or a computing device 126. In some embodiments, the user interface is displayed by display 508 of control terminal 104. Image 952 on user interface 950 may include one or more objects (not shown) captured by imaging device 214 in addition to target 106.

In some embodiments, control unit 104 and/or computer device 126 include one or more input devices 506 for receiving user input. In some embodiments, input received by input devices 506 is used to provide input indicating a user interest in target 106 with which graphical selection indicator 954 is to be associated. In this way, a user indicates a target 106 to be tracked, in accordance with some embodiments. In some embodiments, user input received at input device 506 to associate a graphical selection indicator 954 with target 106 includes an input gesture received at a point that corresponds to target 106. In some embodiments, an input gesture is provided by a contact (e.g., by a finger and/or stylus) at display 508 (e.g., a touchscreen display). In some embodiments, a selection of target 106 is provided by user-manipulated input device 506 (such as a mouse, button, joystick, keyboard, etc.).

As shown in FIG. 9C, a graphical tracking indicator 955 is shown to be associated with target 106. In some embodiments, graphical tracking indicator 955 may be identical with graphical selection indicator 954. In some embodiments, graphical tracking indicator 955 may be generated by the system based on graphical selection indicator 954. For example, graphical tracking indicator 955 may be a bounding box generated by the system as a regular shaped box for enclosing target 106. In some embodiments, target information 408 is generated based on received input (e.g., associated with graphical selection indicator 954) and/or graphical tracking indicator 955 associated with target 106. In some embodiments, the position of graphical tracking indicator 955 changes as the position of target 106 changes, e.g., such that graphical tracking indicator 955 remains associated with (e.g., adjacent to or surrounding) tracked target 106.

In some embodiments as discussed in method 700, the system compares extracted features of target information 408 with one or more characteristics associated with one or more predetermined recognizable target types. For example as shown in FIG. 9C, target 106 may be identified to be a human target. In some embodiments, the system displays an indication box 960 to notify the user that target 106 is identified as a predetermined recognizable target type.

Figure 10B:
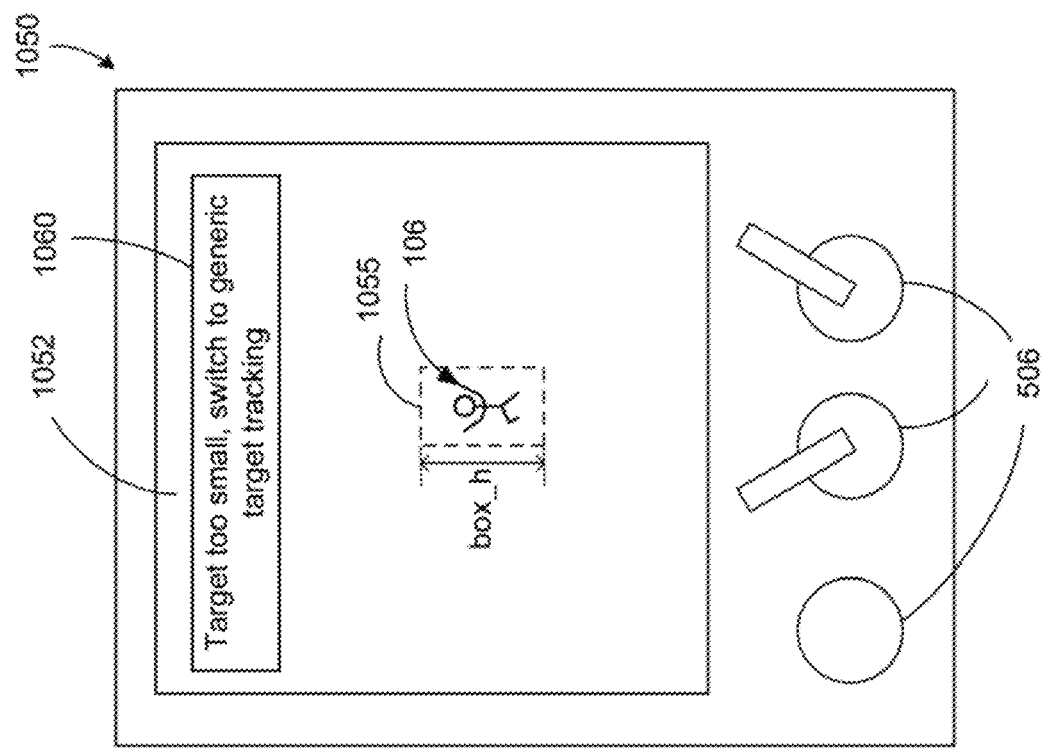
FIG. 10B illustrate an image containing a target displayed on a user interface, in accordance with embodiments.
Figure 10A:
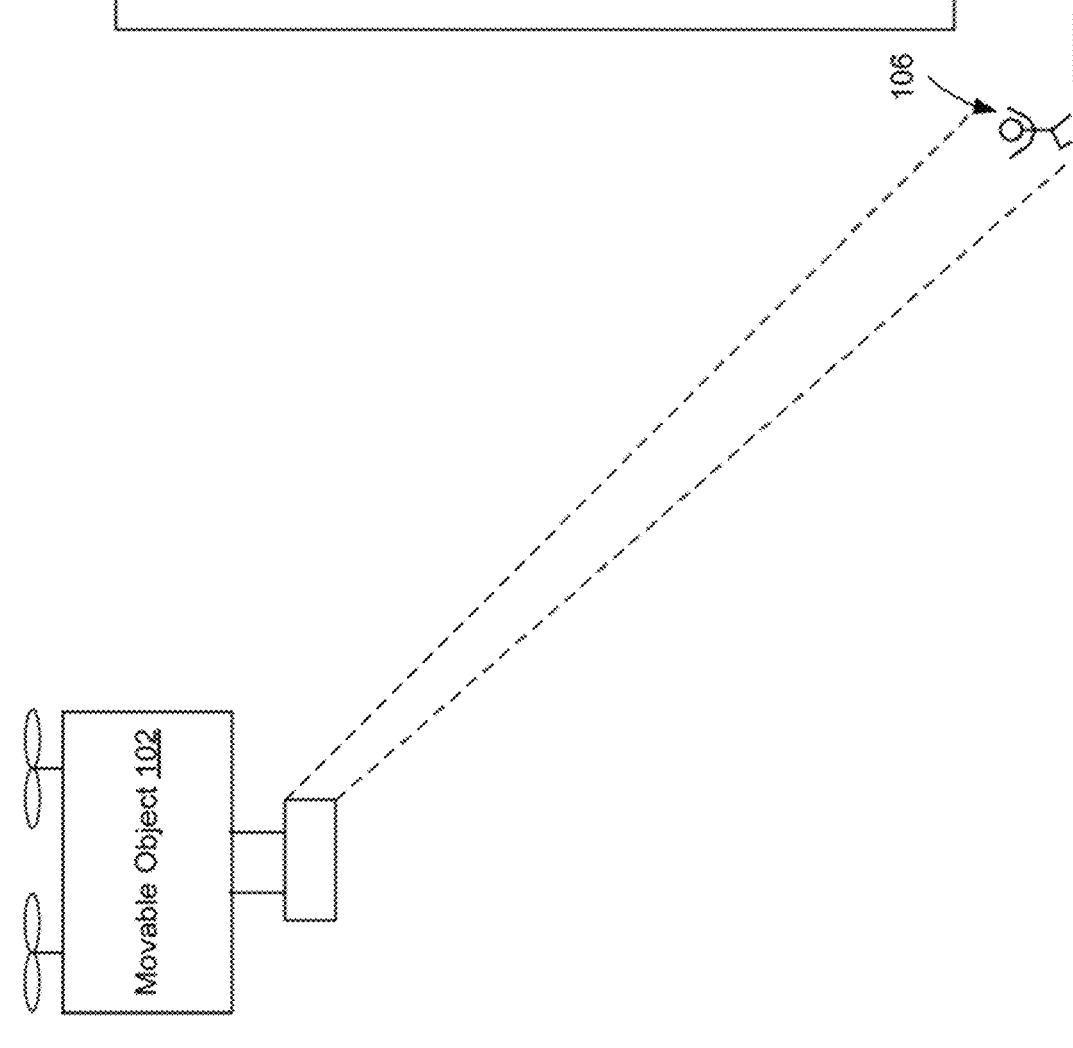
FIG. 10A illustrates an exemplary initialization process for tracking a target, in accordance with some embodiments.

FIG. 10A illustrates an exemplary initialization process for tracking target 106, in accordance with some embodiments. FIG. 10B illustrates an image 1052 containing target 106 displayed on a user interface 1050, in accordance with embodiments. As discussed with reference to method 700 of FIG. 7, in some embodiments, the system determines a dimension of target using a number of pixels included in image 1052. For example, the system determines a height of a bounding box 1055 (box_h) using a number of pixels along a height dimension. In some embodiments, when the height box_h is determined to be smaller than a predetermined threshold value, the system displays a warning indicator 1060 to notify the user that target 106 is too small in image 1052. The system may switch to GT mode 740 as discussed with reference to FIG. 7.

Figure 11:
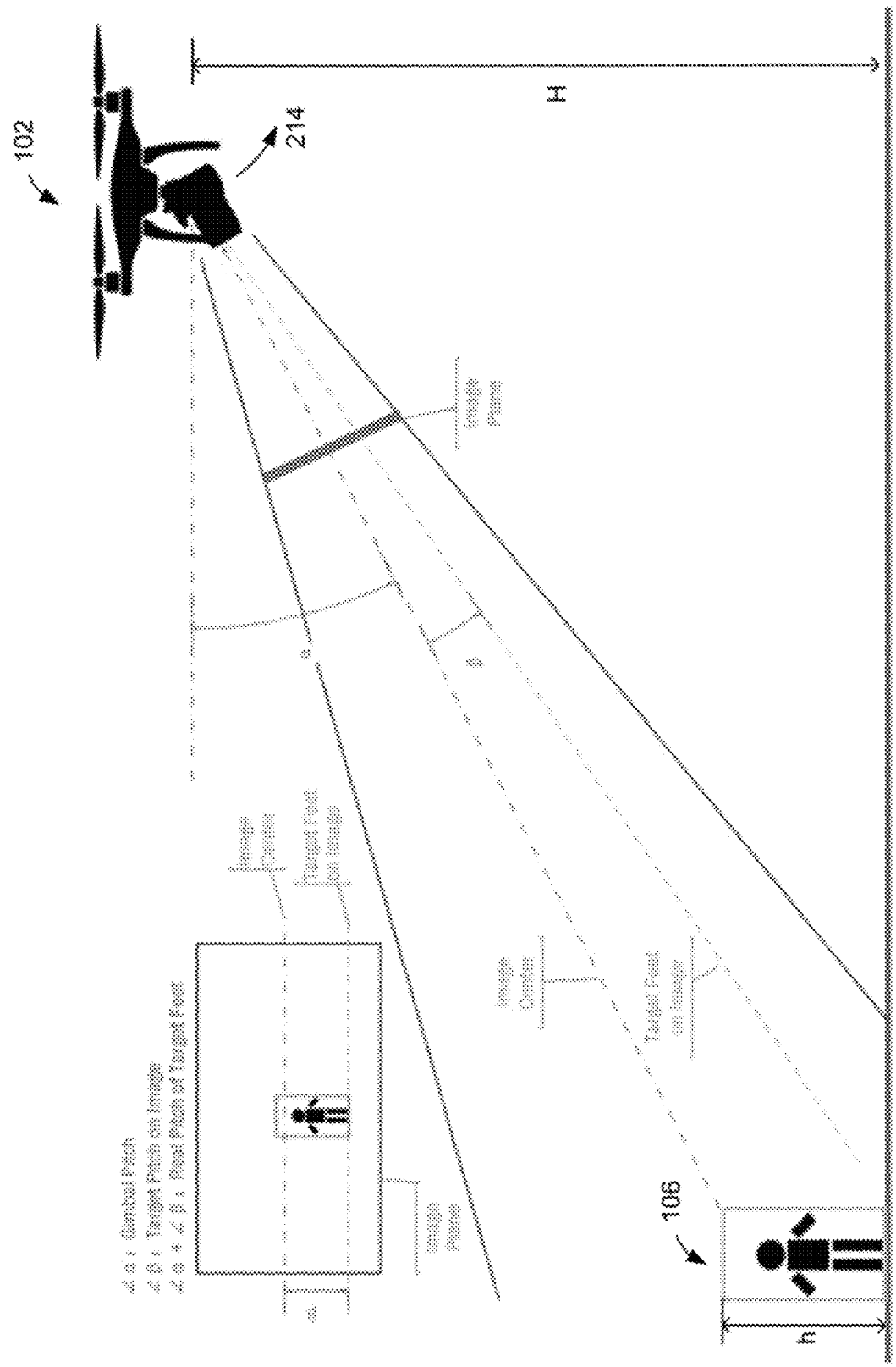
FIG. 11 illustrates an exemplary method for determining a pitch angle, in accordance with some embodiments.

FIG. 11 illustrates an exemplary method for determining a pitch angle between target 106 and movable object 102, in accordance with some embodiments. In some embodiments, the pitch angle is determined based on a pitch angle (α) of a carrier borne by movable object 102 and a target pitch angle (β) on the captured image. For example, as shown in FIG. 11, the pitch angle α indicates a pitch angle of the current image center (e.g., camera center, or optical axis of imaging device 214) relative to the horizontal level. In some embodiments, the pitch angle α is determined based on a pitch angle of a carrier (e.g., a gimbal). In some embodiments, the pitch angle α is determined based on a combination of a pitch angle of payload, a pitch angle of a gimbal, and/or a pitch angle of movable object 102.

In some embodiments, the target pitch angle β is determined based on a number of pixels related to a height (h) which extends from the center of the image to the bottom of target 106. For example, in FIG. 11, the height h extends from the center of the image to the ground (e.g., assume that the human target is standing on the ground).

Figure 12:
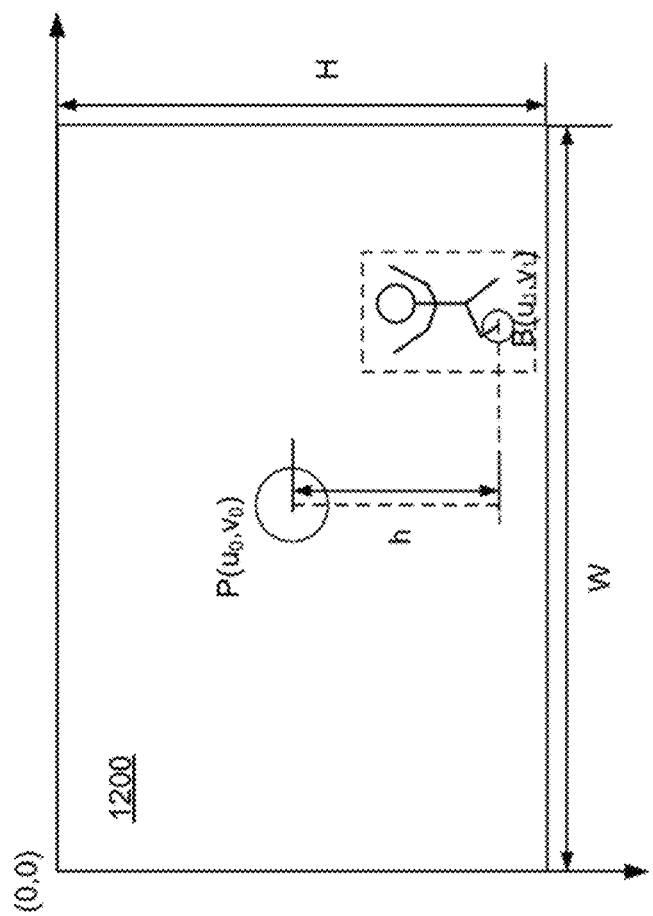
FIG. 12 illustrates an exemplary method for determining a pitch angle of a target 106, in accordance with embodiments.

FIG. 12 illustrates an exemplary method for determining a pitch angle of a target 106, in accordance with embodiments. Assume that an image 1200 has a width of W pixels and a height of H pixels (where W and H are positive integers). A position within the image is defined by a pair of coordinates along the width of the image and along the height of the image, where the upper left corner of image has coordinates (0, 0) and the lower right corner of the image has coordinates (W, H). A center pixel P has a pair of coordinates of $(u_0, v_0)$, where $u_0 = W/2$, and/or $v_0 = H/2$. A pixel B near the feet of the human target has a pair of coordinates of $(u_1, v_1)$. The height (h) between the center of the image and the bottom of target 106 as discussed in FIG. 11 can be calculated as $|v_1 - v_0|$. Assume that image 1200 covers a degree range ($\gamma_1$) along the width of the image, and a degree range ($\gamma_2$) along the height of the image, a degree per pixel (θ) in image 1200 can be determined by $\theta = \gamma_1/W = \gamma_2/H$. For example, when image 1200 covers 81.9281° along the width of the image, and 46.0846° along the height of the image, and has a resolution of 640*360, a degree per pixel (θ) is calculated to be 0.1280127°.

Referring back to FIG. 11, the target pitch angle R can be calculated as $\beta = h \times \theta$. Thus the pitch angle between target 106 and movable object 102 can be determined by a sum of the gimbal pitch angle α and the target pitch angle β. As discussed in method 700 of FIG. 7, in some embodiments, the system compares the calculated pitch angle between target 106 and movable object 102 with a predetermined threshold value (e.g., −40°). When the calculated pitch angle between target 106 and movable object 102 is smaller than the predetermined threshold value, for example, when the calculated pitch angle between target 106 and movable object 102 is calculated to be −60°, the system may send a warning indicator (e.g., a visual or an audio indicator) to notify the user that pitch angle is not suitable for automatic target tracking.

Figure 13B:
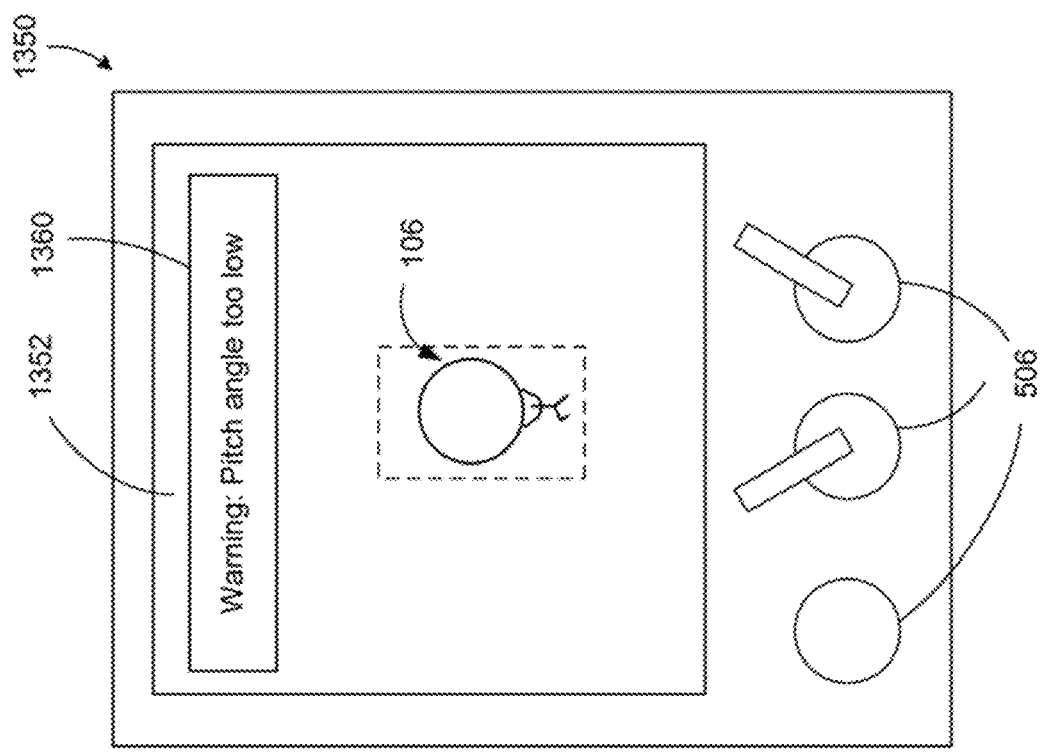
FIG. 13B illustrate an image containing a target displayed on a user interface, in accordance with embodiments.
Figure 13A:
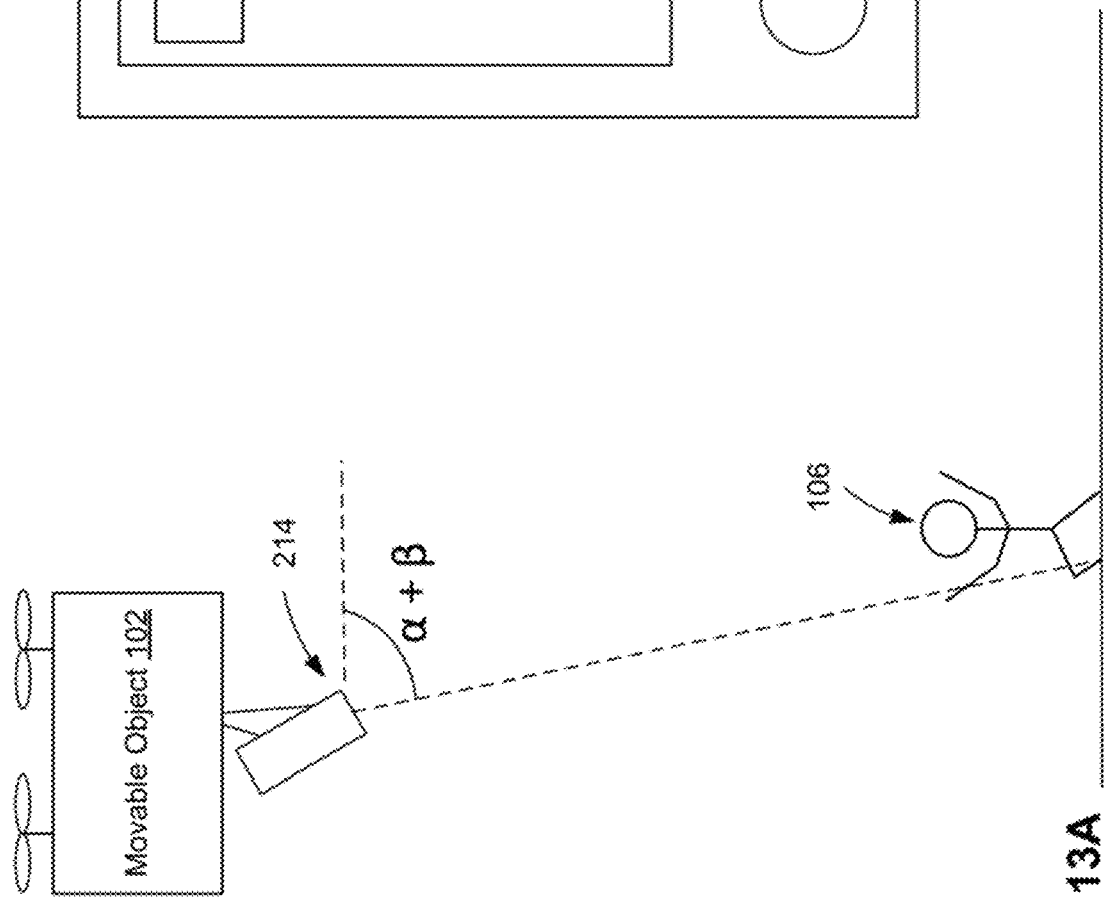
FIG. 13A illustrates an initialization process for tracking a target, in accordance with some embodiments.

FIG. 13A illustrates an initialization process for tracking target 106, in accordance with some embodiments. FIG. 13B illustrates an image 1352 containing target 106 displayed on a user interface 1350, in accordance with embodiments. In some embodiments when the pitch angle between target 106 and movable object 102 is smaller than the predetermined threshold value, movable object 102 hovers on top of target 106 as shown in FIG. 13A. Imaging device 214 may not be able to capture sufficient information of target 106 from this pitch angle. For example, target 106 shown in image 1352 of FIG. 13B may demonstrate different features (e.g., shape, pattern, or size) from the characteristics of a predetermined recognizable target (e.g., a human target). So the system displays a warning indicator 1360 to notify the user, for example, by displaying a text "Warning: Pitch angle too low" on user interface 1350.

Figure 14:
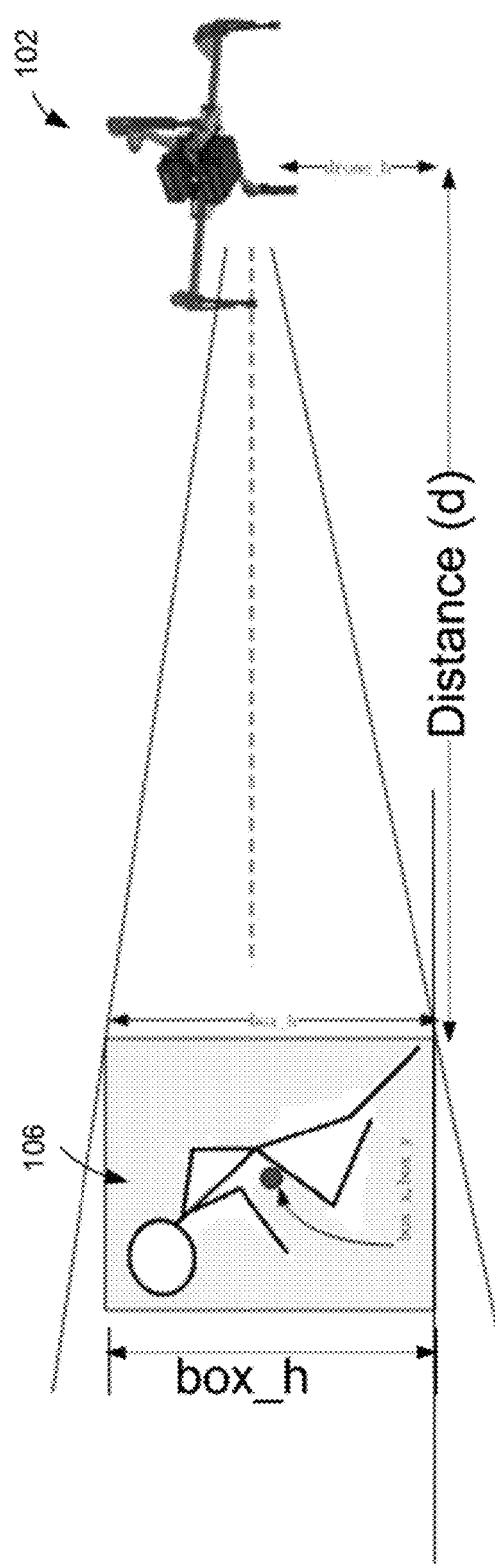
FIG. 14 illustrates an exemplary method for determining a horizontal distance between a target and a movable object, in accordance with embodiments.

FIG. 14 illustrates an exemplary method for determining a horizontal distance between a predetermined recognizable target and movable object 102, in accordance with embodiments. In some embodiments, movable object 102 is at a similar height with a height of target 106. In some embodiments, when target 106 is identified to be a predetermined recognizable target (e.g., a human target), a horizontal distance (d) between target 106 and movable object 102 using one or more characteristics associated with the predetermined recognizable target, such as a height of the human target (target_h). For instance, after identifying target 106 to be a human target, a height of 1.7 meters based on preset characteristics of predetermined recognizable target type information 414 is assigned to target 106. The distance d between target 106 and movable object 102 can be expressed as:

$$d = \frac{\text{target\_h}}{2 * \tan(\text{box\_h} * \theta)}$$

where target_h is a characteristic of a predetermined recognizable target preset by predetermined recognizable target type information 414 (e.g., an average height of a human), box_h is a height of a bounding box enclosing target 106 (which approximates to the height of target 106 displayed in the current image), and θ is the degree per pixel of in the current image as discussed in FIG. 12. In some embodiments as discussed in method 700 of FIG. 7, a safe distance range is determined based on a height of movable object 102. The system compares the calculated distance d with the safe distance range, and sends a warning indicator to the user when the distance d is not within the safe distance range.

Figure 15:
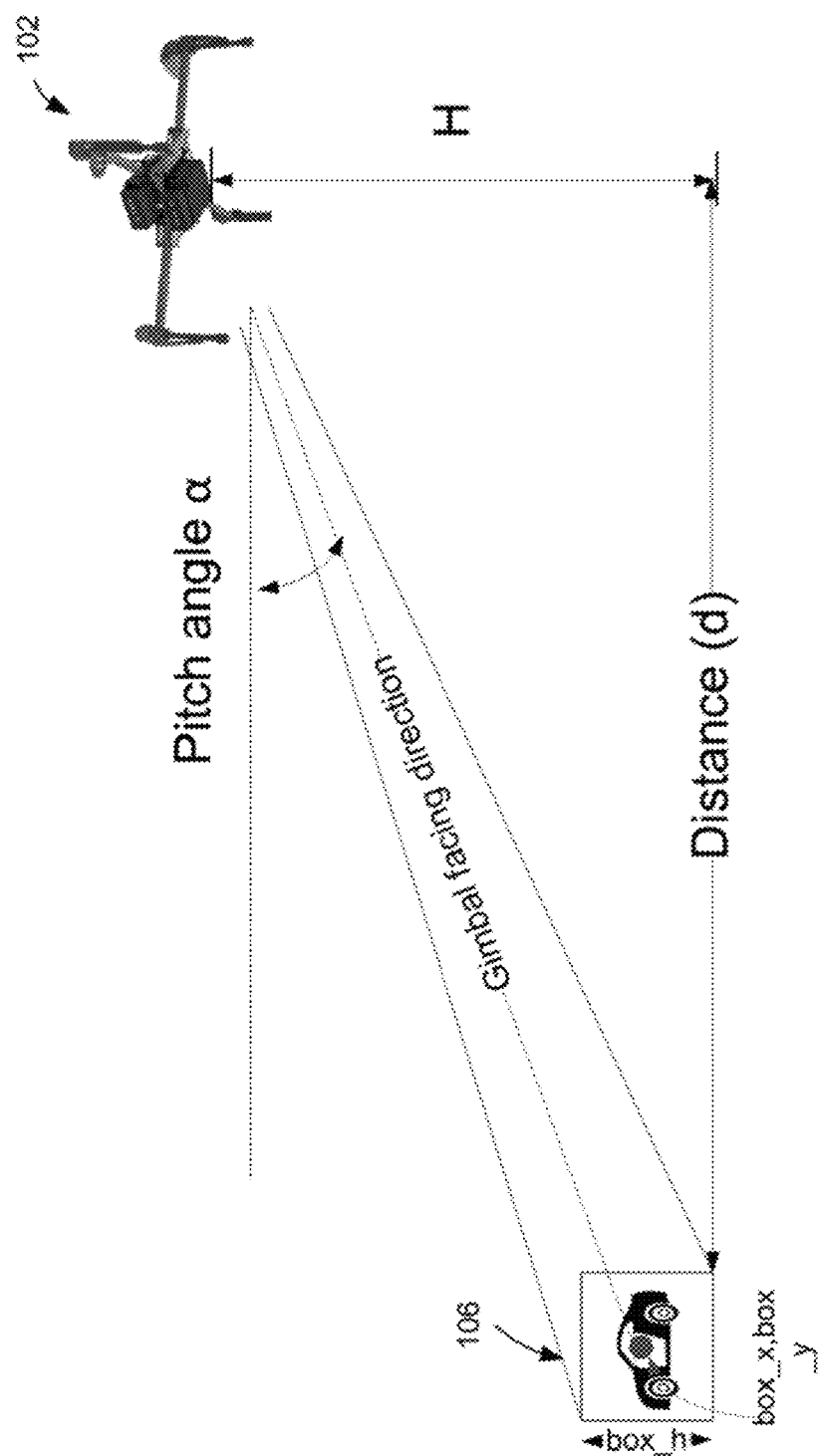
FIG. 15 illustrates an exemplary method for determining a horizontal distance between a generic target and a movable object, in accordance with embodiments.
Figure 16A:
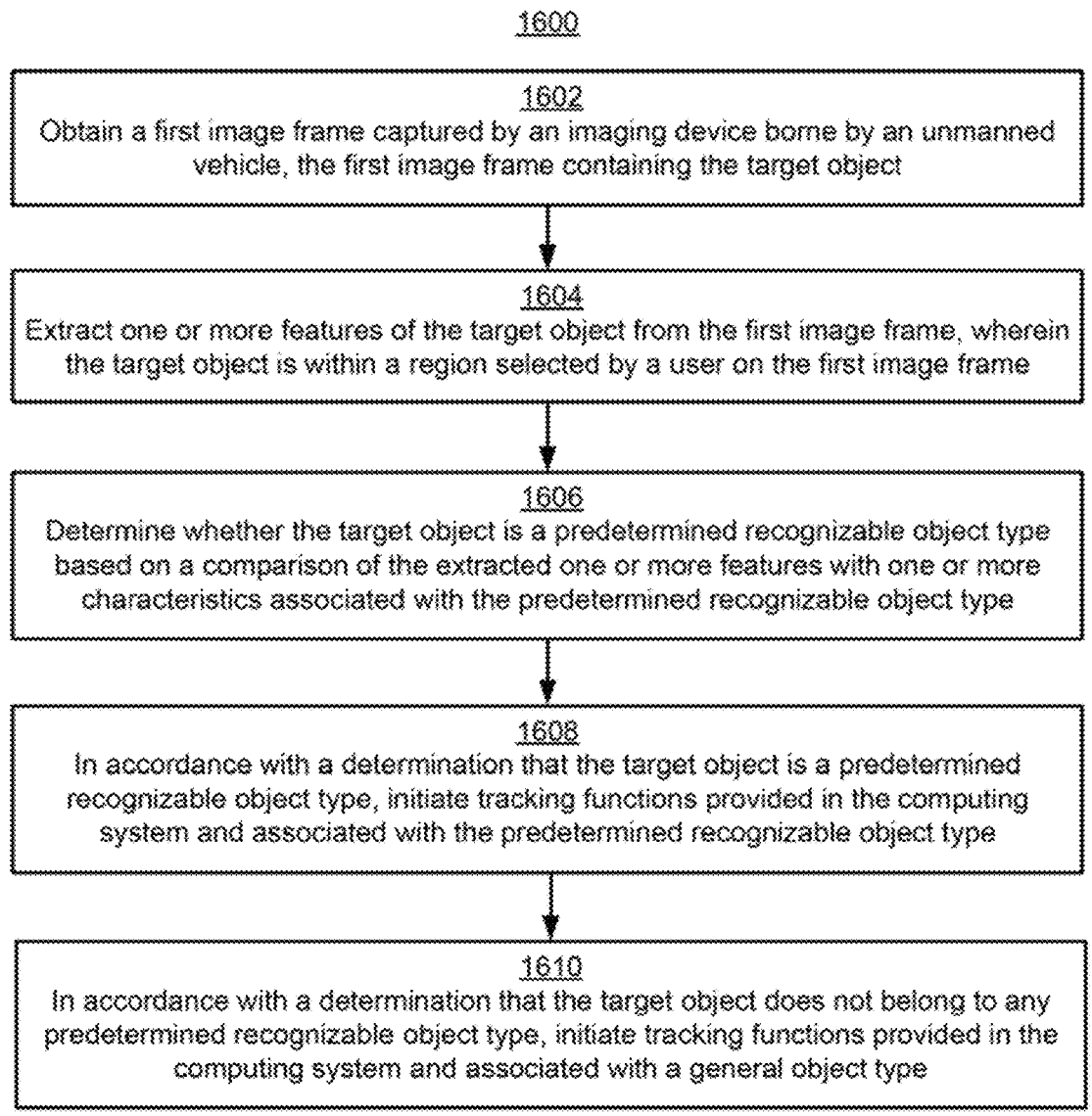

FIG. 15 illustrates an exemplary method for determining a horizontal distance between a generic target and movable object 102, in accordance with embodiments. In some embodiments, when target 106 is identified to be a generic target, the system determines a horizontal distance (d) between target 106 and movable object 102 using a triangulation method. For instance, the distance d between generic target 106 and movable object 102 can be expressed as:

$$d = \frac{H}{\tan(\alpha)}$$

where H is a height of movable object 102, and α is a pitch angle of a carrier of imaging device 214, such as a gimbal.

FIGS. 16A-16F are a flow diagram illustrating a method 1600 for tracking a movable object, in accordance with some embodiments. The method 1600 is performed at a system, such as one or more devices including moving object 102, control unit 104 and/or computing device 126. For example, instructions for performing the method 1600 are stored in motion control module 402 of memory 118 and executed by processor(s) 116. In some embodiments, the computing functionalities discussed herein are performed at movable object 102, at the ground controller (such as control unit 104 and/or computing device 126), or at a combination of certain computing functionalities contained in both movable object 102 and the ground controller. In some embodiments, one or more steps of method 1600 are performed at the ground controller, and one or more other steps of method 1600 are performed at movable object 102.

The system obtains (1602) a first image frame captured by imaging device 214 borne by movable object 102. The first image frame contains target 106.

The system extracts (1604) one or more features of target 106 from the first image frame. Target 106 is within a region selected by a user on the first image frame. The one or more features of the target object comprise (1652) one or more dimensional features displayed on the first image frame. The one or more dimensional features include a shape, a pattern, a length, a width, and/or a height of the target object. The system generates (1654) a bounding box based on the one or more dimensional features of target 106 for defining target 106 on the first image frame. The system obtains (1656) a second image frame including target 106 captured by imaging device 214. The one or more features of target 106 further comprise a speed and an acceleration of the target 106 calculated based on the one or more dimensional features of the target 106. In some embodiments, the second image frame is a subsequent image frame of the first image frame. In some embodiments, the second image frame is an image captured after the first image frame after a certain period of time.

The system determines (1606) whether target 106 is a predetermined recognizable object type based on a comparison of the extracted one or more features with one or more characteristics associated with the predetermined recognizable object type. In some embodiments, the system performs image recognition and/or an object classification to identify target 106.

In accordance with a determination that target 106 is a predetermined recognizable object type (e.g., a human target), the system initiates (1608) tracking functions provided in the system and associated with the predetermined recognizable object type. In accordance with a determination that the target 106 does not belong to any predetermined recognizable object type, the system initiates (1610) tracking functions provided in the computing system and associated with a general object type.

When target 106 is determined to be a predetermined recognizable object type, the tracking functions associated with the predetermined recognizable object type include (1612) adjusting one or more control parameters that control one or more selected from a spatial relationship between movable object 102 and target 106, a movement of movable object 102, and a movement of carrier 108 (e.g., a gimbal) borne by movable object 102. In some embodiments, the system adjusts control parameters and spatial relationship between movable object 102 and target 106. In some embodiments, the system enables certain functional modules that allow certain advanced controls. For instance, the system enables controlling flying pattern of movable object 102 and/or adjusting position of carrier 108 using human gestures.

In some embodiments, when target 106 is identified to be a human, the system recognizes (1638) one or more body gestures of the human target. For example, the system can recognize a hand wave, a finger gesture, and any other body gestures of the human target. In some embodiments, the system adjusts (1640) one or more control parameters of movable object 102 in accordance with the one or more body gestures of the human target. In some embodiments, when target 106 is identified to be a human, the system performs (1642) a facial recognition of the human target to retrieve one or more facial features of the human target. In some embodiments, when movable object 102 loses the human target in the subsequent captured images, the facial features of the human target may be used to find the previous human target and to avoid identifying a wrong human target. In some embodiments, when the target 106 is identified to be a human, the system performs (1644) machine learning to obtain one or more personal features of the human target. The obtained personal features can be used for automatically tracking the human target by movable object 102.

In some embodiments, the one or more control parameters are generated (1614) in accordance with one or more characteristics associated with the predetermined recognizable object type. For example, a characteristic (e.g., speed, height, etc.) are used for generating the one or more control parameters. In some embodiments, the one or more control parameters comprise (1616) a yaw angle movement of movable object 102, a translational movement of movable object 102, a velocity of movable object 102, and an acceleration of movable object 102. In some embodiments, the translational movement of movable object 102 comprises a horizontal movement of movable object 102 and/or a vertical movement of movable object 102.

In some embodiments, imaging device 214 is coupled (1618) to carrier 108 (e.g., a gimbal) borne by movable object 102. The one or more control parameters further comprise (1618) a yaw angle movement of the gimbal and/or a pitch angle movement of the gimbal.

In some embodiments, the system determines (1620) the spatial relationship between movable object 102 and target 106 using at least the one or more characteristics associated with the predetermined recognizable object type.

In some embodiments, prior to determining the spatial relationship between movable object 102 and target 106, the system determines (1622) whether a dimension of the target 102 displayed in the first image frame is above a predetermined threshold value. In some embodiments, the dimension of target 102 is determined by a number of pixels displayed on the first image frame. In some embodiments, a minimum number of pixels is preset as the threshold value that is sufficient for movable object 102 to track target 106. In some embodiments, in accordance with a determination that the dimension of target 106 is above or equal to the predetermined threshold value, the system determines (1622) the spatial relationship between movable object 102 and target 106. In some embodiments, in accordance with a determination that the dimension of target 106 is below the predetermined threshold value, the system initiates (1622) tracking functions associated with the general object type. In some embodiments, when the system determines that the dimension of target 106 is below the predetermined threshold value, the system switches from PRT mode to GT mode as discussed in method 700 of FIG. 7.

In some embodiments, the spatial relationship between movable object 102 and target 106 comprises (1624) a horizontal distance between movable object 102 and target 106. In some embodiments, the spatial relationship comprises (1626) a pitch angle between movable object 102 and target 106. The system further determines (1626) whether the pitch angle is lower than a predetermined value (e.g., −40 degrees). In some embodiments, the pitch angle is determined (1628) using a pitch angle (e.g., pitch angle α of FIG. 11) of a gimbal borne by movable object 102 for carrying the imaging device and a target pitch angle (e.g., pitch angle 3 of FIG. 11) of the target 106 displayed on the first image frame.

In accordance with a determination that the pitch angle is lower than the predetermined value, the system sends (1630) a warning indication to the user (e.g., as shown in FIG. 13B). In some embodiments, the system adjusts (1632), or allows (1632) the user to adjust, the one or more control parameters of movable object 102 such that an updated pitch angle is equal to or above the predetermined value. The system obtains (1632) one or more image frames subsequent to the first image frame for determining the updated pitch angle.

In accordance with a determination that the pitch angle is higher or equal to the predetermining value, the system sends (1634) a request to the user to confirm to initiate an automatic tracking mode. For instance, the system send a request to the user to start automatically track the identified predetermined recognized target using the one or more associated characteristics.

In accordance with a determination that the user does not confirm to initiate the automatic tracking mode, the system obtains (1636) a second image frame including target 106. The system determines (1636) whether target 106 is a predetermined recognizable object type based on a comparison of extracted one or more features from the second image frame with one or more characteristics associated with the predetermined recognizable object type. In accordance with a determination that target 106 does not belong to any predetermined recognizable object type, the system initiates (1636) the tracking options associated with the general object type. In some embodiments, before receiving user confirmation on the first image frame, the system switches from PRT mode to GT mode when target features on the next frame do not match any predetermined recognizable target type.

In some embodiments, the system determines (1646) whether a height of movable object 102 relative to the ground is within a predetermined height range (e.g., a range from about 1 meter to about 50 meters). When the movable object 102 is too high, target 106 may become too small to extract sufficient features for target tracking. Movable object 102 cannot be too low for safety concern. In accordance with a determination that the height of movable object 102 is not within the predetermined height range, the system sends a warning signal to the user. The user may manually adjust the height of movable object 102 to be within the predetermined height range. The determination of height may occur at any step of method 700.

In some embodiments, the system obtains (1648) the one or more characteristics associated with one or more predetermined recognizable object types respectively. The one or more characteristics associated with one or more predetermined recognizable object types may be obtained from user input, from image recognition, and/or from any information available on computer network.

In some embodiments, the one or more characteristics associated with the predetermined recognizable object type comprises (1650) a category, a shape, a pattern, a length range, a width range, a height range, a speed range, and/or an acceleration range of one or more objects of the predetermined recognizable object type.

In some embodiments, the system provides (1658) one or more candidate recognizable object types for user selection. The one or more candidate recognizable object types are identified based on the comparison between the extracted one or more features and one or more characteristics associated with one or more predetermined recognizable object types respectively. In some embodiments, the system determines the features of target 106 match the characteristics of more than one predetermined recognizable object type. The system displays the identified more than one predetermined recognizable object type to the user for user selection. The system receives (1658) a user input indicating the target object is the predetermined recognizable object type selected from the one or more candidate recognizable object types.

When target 106 is determined to be the generic target object type, the system determines (1660) a spatial relationship between target 106 and movable object 102 using the one or more extracted features. In some embodiments, the spatial relationship between target 106 and movable object 102 comprises (1662) a horizontal distance between target 106 and movable object 102. The system determines (1662) whether the horizontal distance is within a predetermined distance range.

In accordance with a determination that the horizontal distance is within the predetermined distance range, the system provides (1664) an option to the user to confirm to initiate the automatic tracking mode.

In accordance with a determination that the user does not confirm to initiate the automatic tracking mode, the system obtains (1666) a second image frame including target 106 subsequent to the first image frame. The system determines (1666) whether target 106 is a predetermined recognizable object type based on a comparison of extracted one or more features from the second image frame with one or more characteristics associated with the predetermined recognizable object type. In accordance with a determination that target 106 is a predetermined recognizable object type, the system initiates (1666) the tracking options associated with the predetermined recognizable object type. In some embodiments, before receiving user confirmation on the first image frame, the system switches from GT mode to PRT mode when target on the next frame is identified to be a predetermined recognizable target type.

In some embodiments, the horizontal distance range is determined (1670) in accordance with a height of movable object 102 relative to the ground. For instance, a safe distance range increases as the height of movable object 102 increases. In accordance with a determination that the horizontal distance is not within the predetermined distance range, the system sends (1672) a warning indication to the user. In some embodiments, the system adjusts (1674), or allows (1674) the user to adjust, one or more control parameters of movable object 102 such that an updated spatial relationship between movable object 102 and target 106 becomes suitable for initiating the automatic tracking mode. The system obtains (1674) one or more image frames subsequent to the first image frame for determining the updated spatial relationship between movable object 102 and target 106.

In some embodiments, the tracking functions associated with the predetermined recognizable object type include (1676) enabling one or more functional modules that allow movable object 102 to be controlled by a user input. In some embodiments, the system receives a user input indicating a user interest of the target 106 on the first image frame. In some embodiments, the user input is received from a device (e.g., control device 104 and/or computer device 126) when user views the first image frame on the device. In some embodiments, the user input indicates a boundary surrounding at least a part of target 106 displayed on the device. In some embodiments, the user input indicates a location of target 106 displayed on the device. In some embodiments, the user input is a user gesture captured by imaging device 214 borne by movable object 102.

In some embodiments, the system obtains (1678) a second image frame captured by imaging device 214. The system determines whether target 106 in the first image frame is still contained in the second image frame. In accordance with a determination that the target object is not included in the second image frame, the system identifies (1678) one or more candidate target objects from the second image frame. The candidate target objects may be identified to belong to the same predetermined recognizable object type. The one or more candidate target objects are identified based on comparison between one or more features extracted from the one or more candidate target objects respectively and one or more characteristics associated with the predetermined recognizable object type. The system determines (1678) whether the one or more extracted features of the respective one or more candidate target objects fit a target object model generated based on the one or more extracted features of the target object in the first image frame. In accordance with a determination that one or more extracted features of a candidate target object fits the target object model, the system initiates (1678) the tracking operations associated with the target object. The target object model may be generated using one or more characteristics associated with the predetermined recognizable target object type. In some embodiments, the system generates one or more control parameters of movable object 102 to ensure target 106 is located at a center of one or more image frames subsequent to the first image frame captured by imaging device 214.

Many features of the present disclosure can be performed in, using, or with the assistance of hardware, software, firmware, or combinations thereof. Consequently, features of the present disclosure may be implemented using a processing system. Exemplary processing systems (e.g., processor(s) 116, controller 210, controller 218, processor(s) 502 and/or processor(s) 602) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable medium (media) having instructions stored thereon/in which can be used to program a processing system to perform any of the features presented herein. The storage medium (e.g., (e.g. memory 118, 504, 604) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Communication systems as referred to herein (e.g., communication systems 120, 510, 610) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11 b, IEEE 102.11g and/or IEEE 102.11 n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for tracking a target object, comprising:
   at a computing system having one or more processors and memory storing programs executed by the one or more processors:
   obtaining an image frame captured by an imaging device carried by an unmanned vehicle, the image frame containing the target object;
   extracting one or more features of the target object from the image frame, the target object being within a region selected by a user on the image frame;
   determining whether the target object is a predetermined recognizable object type based on a comparison of the one or more features with one or more characteristics associated with the predetermined recognizable object type;
   in accordance with a determination that the target object is the predetermined recognizable object type, initiating tracking functions provided in the computing system and associated with the predetermined recognizable object type, wherein the tracking functions associated with the predetermined recognizable object type include, in response to identifying the target object to be a human:
   recognizing one or more body gestures of the target object; and
   adjusting one or more control parameters of the unmanned vehicle in accordance with the one or more body gestures of the target object, the one or more control parameters controlling at least one of a spatial relationship between the unmanned vehicle and the target object, a movement of the unmanned vehicle, or a movement of a gimbal carried by the unmanned vehicle; and
   in accordance with a determination that the target object does not belong to the predetermined recognizable object type, initiating tracking functions provided in the computing system and associated with a general object type.

2. The method of claim 1, wherein the one or more control parameters are generated in accordance with the one or more characteristics associated with the predetermined recognizable object type.

3. The method of claim 1, wherein the one or more control parameters comprise at least one of a yaw angle movement of the unmanned vehicle, a translational movement of the unmanned vehicle, a velocity of the unmanned vehicle, or an acceleration of the unmanned vehicle.

4. The method of claim 1, wherein the imaging device is coupled to the gimbal, and the one or more control parameters comprise at least one of a yaw angle movement of the gimbal or a pitch angle movement of the gimbal.

5. The method of claim 1, further comprising:
   determining the spatial relationship between the unmanned vehicle and the target object using at least the one or more characteristics associated with the predetermined recognizable object type.

6. The method of claim 1, further comprising:
   determining whether a dimension of the target object displayed in the image frame is above a predetermined threshold value;
   in accordance with a determination that the dimension of the target object is above or equal to the predetermined threshold value, determining the spatial relationship between the unmanned vehicle and the target object; and
   in accordance with a determination that the dimension of the target object is below the predetermined threshold value, initiating the tracking functions associated with the general object type.

7. The method of claim 1, wherein the spatial relationship between the unmanned vehicle and the target object comprises a horizontal distance between the unmanned vehicle and the target object.

8. The method of claim 1,
wherein the spatial relationship comprises a pitch angle between the unmanned vehicle and the target object;
the method further comprising:
determining whether the pitch angle is lower than a predetermined value.

9. The method of claim 8, further comprising:
in accordance with a determination that the pitch angle is lower than the predetermined value:
sending a warning indication to the user;
adjusting, or allowing the user to adjust, the one or more control parameters of the unmanned vehicle such that an updated pitch angle is equal to or above the predetermined value; and
obtaining one or more subsequent image frames for determining the updated pitch angle;
wherein the pitch angle is determined using a pitch angle of the gimbal carried by the unmanned vehicle and a target pitch angle of the target object displayed on the image frame.

10. The method of claim 8, further comprising:
in accordance with a determination that the pitch angle is higher than or equal to the predetermining value, sending a request to the user to confirm to initiate an automatic tracking mode.

11. The method of claim 1, further comprising:
in response to identifying the target object to be a human, performing machine learning to obtain one or more personal features of the target object, the one or more personal features being used for automatically tracking the target object by the unmanned vehicle.

12. The method of claim 1, wherein determining whether the target object is the predetermined recognizable object type comprises:
providing one or more candidate recognizable object types for user selection, the one or more candidate recognizable object types being identified based on the comparison between the one or more features and one or more characteristics associated with the one or more candidate recognizable object types; and
receiving a user input indicating the target object is the predetermined recognizable object type selected from the one or more candidate recognizable object types.

13. The method of claim 1, wherein the tracking functions associated with the general object type comprise determining a spatial relationship between the target object and the unmanned vehicle using the one or more features.

14. The method of claim 13,
wherein the spatial relationship between the target object and the unmanned vehicle comprises a horizontal distance between the target object and the unmanned vehicle;
the method further comprising:
determining whether the horizontal distance is within a predetermined distance range.

15. The method of claim 14, further comprising:
in accordance with a determination that the horizontal distance is within the predetermined distance range, providing an option to the user to confirm to initiate an automatic tracking mode.

16. The method of claim 15,
wherein the image frame is a first image frame and the one or more features are one or more first features;
the method further comprising, in accordance with a determination that the user does not confirm to initiate the automatic tracking mode:
obtaining a second image frame including the target object subsequent to the first image frame;
determining whether the target object is the predetermined recognizable object type based on a comparison of one or more second features extracted from the second image frame with the one or more characteristics associated with the predetermined recognizable object type; and
in accordance with a determination that the target object is the predetermined recognizable object type, initiating the tracking options associated with the predetermined recognizable object type.

17. The method of claim 14, further comprising, in accordance with a determination that the horizontal distance is not within the predetermined distance range:
sending a warning indication to the user;
adjusting, or allowing the user to adjust, one or more control parameters of the unmanned vehicle such that an updated spatial relationship between the unmanned vehicle and the target object becomes suitable for initiating an automatic tracking mode; and
obtaining one or more subsequent image frames for determining the updated spatial relationship between the unmanned vehicle and the target object.

18. The method of claim 1,
wherein the image frame is a first image frame;
the method further comprising:
obtaining a second image frame captured by the imaging device;
in accordance with a determination that the target object is not included in the second image frame:
identifying one or more candidate target objects from the second image frame that belong to the predetermined recognizable object type, the one or more candidate target objects being identified based on comparison between one or more features extracted from the one or more candidate target objects respectively and the one or more characteristics associated with the predetermined recognizable object type;
determining whether the one or more features of the one or more candidate target objects fit a target object model generated based on the one or more features of the target object; and
in accordance with a determination that one or more features of one of the one or more candidate target objects fit the target object model, initiating tracking operations associated with the target object.

* * * * *